(12) United States Patent
Suzuki et al.

(10) Patent No.: US 12,326,718 B2
(45) Date of Patent: Jun. 10, 2025

(54) OPERATION INFORMATION COLLECTION SYSTEM FOR FLUID CONTROL DEVICE, FLUID CONTROL DEVICE, OPERATION INFORMATION COLLECTION METHOD FOR FLUID CONTROL DEVICE, AND COMPUTER EXECUTABLE PROGRAM

(71) Applicant: Fujikin Incorporated, Osaka (JP)

(72) Inventors: Yuya Suzuki, Osaka (JP); Ryutaro Tanno, Osaka (JP); Tsutomu Shinohara, Osaka (JP); Koudai Okazaki, Osaka (JP)

(73) Assignee: Fujikin Incorporated, Osaka (JP)

( * ) Notice: Subject to any disclaimer, the term of this patent is extended or adjusted under 35 U.S.C. 154(b) by 428 days.

(21) Appl. No.: 17/777,629

(22) PCT Filed: Nov. 25, 2020

(86) PCT No.: PCT/JP2020/043912
§ 371 (c)(1),
(2) Date: May 18, 2022

(87) PCT Pub. No.: WO2021/106966
PCT Pub. Date: Jun. 3, 2021

(65) Prior Publication Data
US 2022/0397885 A1  Dec. 15, 2022

(30) Foreign Application Priority Data
Nov. 28, 2019 (JP) .................. 2019-215303

(51) Int. Cl.
*G05B 19/416* (2006.01)
*F16K 31/12* (2006.01)
*F16K 37/00* (2006.01)

(52) U.S. Cl.
CPC .. *G05B 19/416* (2013.01); *G05B 2219/37371* (2013.01)

(58) Field of Classification Search
CPC ........ G05B 19/416; G05B 2219/37371; F16K 31/1226; F16K 37/0033; F16K 37/0041;
(Continued)

(56) References Cited

U.S. PATENT DOCUMENTS 6,505,907 B2 * 1/2003 Ishinaga ................ B41J 2/1623
347/17
8,958,993 B2 2/2015 Maruyama et al.
(Continued)

FOREIGN PATENT DOCUMENTS

JP  H08189851 A  7/1996
TW  201032012 A1  9/2010
(Continued)

*Primary Examiner* — Michael J Brown
(74) *Attorney, Agent, or Firm* — WCF IP

(57) ABSTRACT

An operation information collection system for a fluid control device configured as an operation information collection module includes a detected value acquisition unit acquiring a detected value of a state change or a device operation able to detect opening/closing operations from the fluid control device, a calculation processing unit calculating a rate of change of detected values separated by a predetermined time based on the detected value, and an operation information registration unit registering the rate of change of the detected values separated by the predetermined time to an operation information storage unit as an operation information of the fluid control device.

14 Claims, 24 Drawing Sheets

(58) Field of Classification Search
CPC ............ F16K 31/1221; F16K 37/0025; G01M 3/2876; Y02P 90/02
USPC ........................................................ 700/282
See application file for complete search history.

(56) References Cited

U.S. PATENT DOCUMENTS

2020/0080663 A1    3/2020  Suzuki et al.
2021/0302264 A1*   9/2021  Tanno ................... F16K 37/005

FOREIGN PATENT DOCUMENTS

WO      2010095259 A1    8/2010
WO      2018168873 A1    9/2018

* cited by examiner

FIG. 1
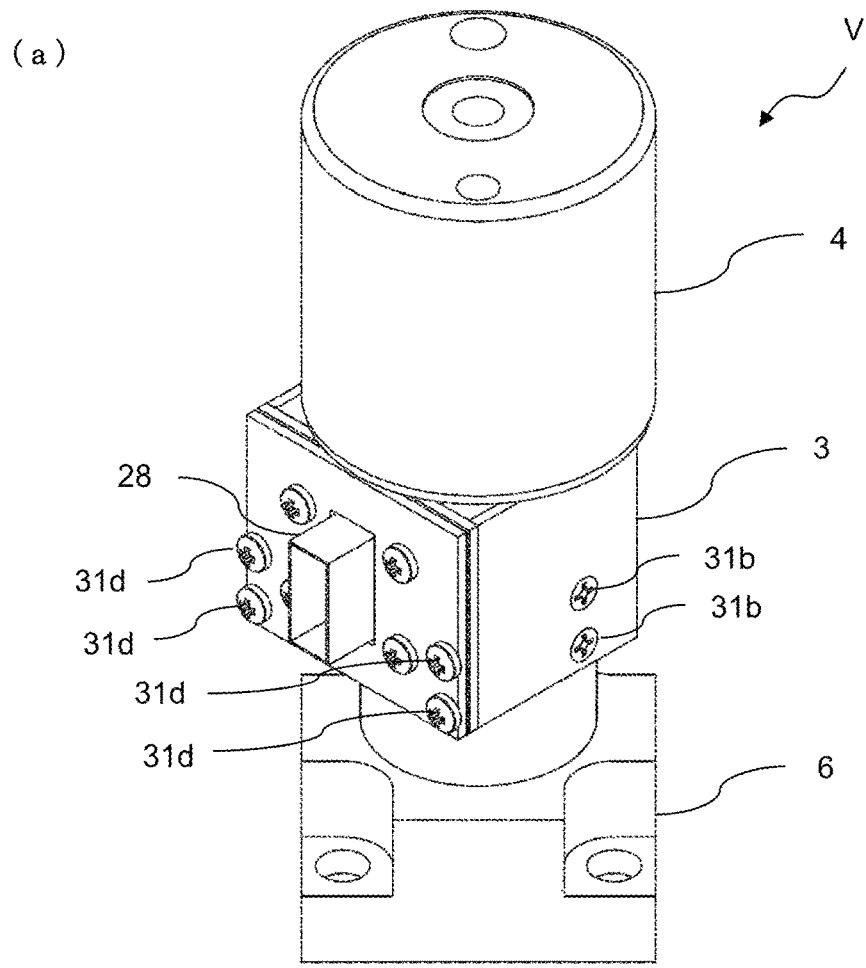
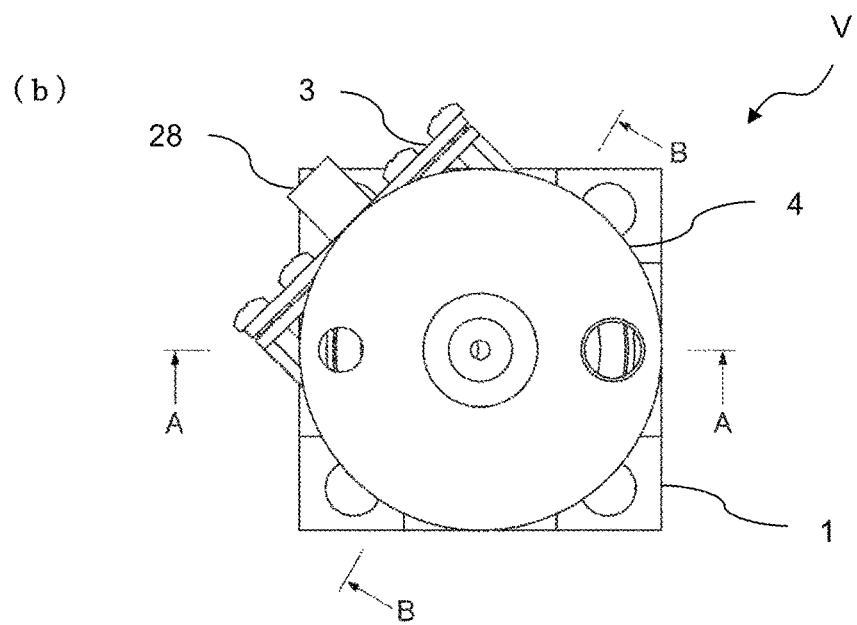

FIG. 13
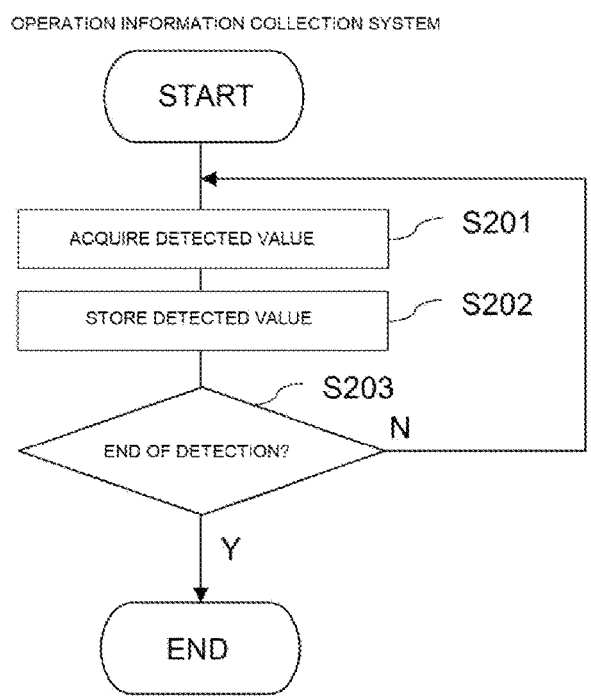
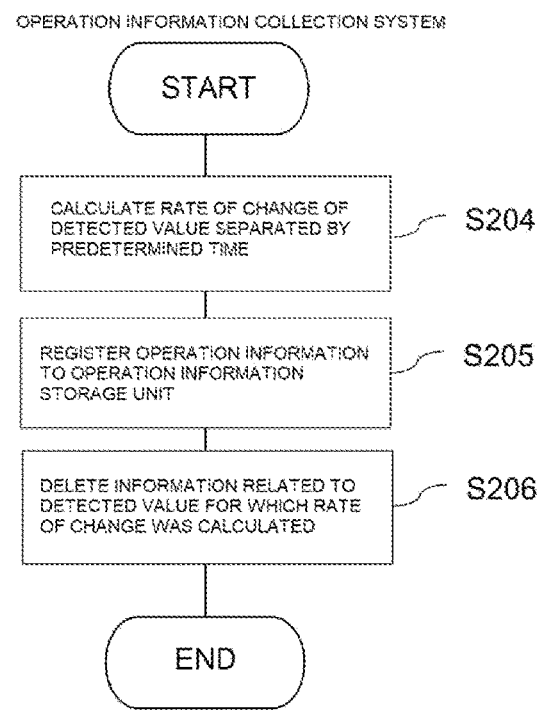

FIG. 15
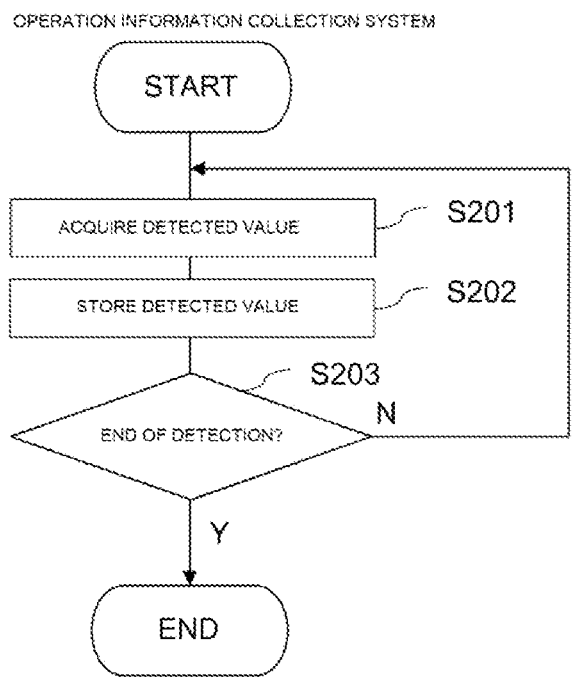
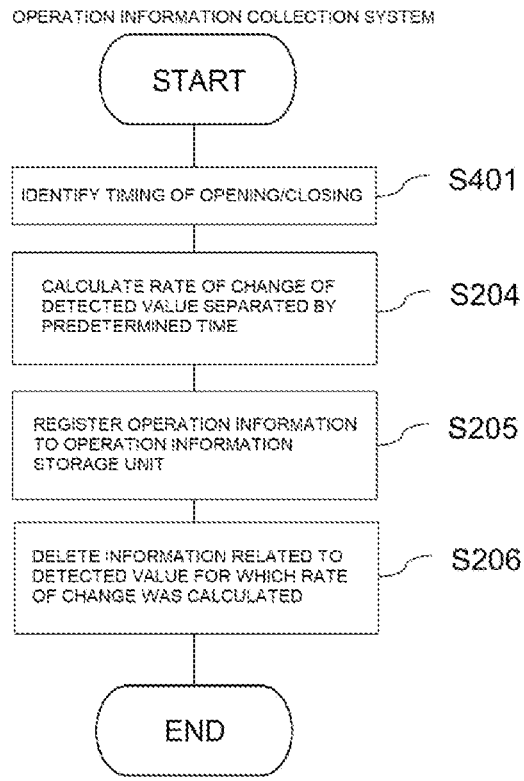

OPERATION INFORMATION COLLECTION SYSTEM FOR FLUID CONTROL DEVICE, FLUID CONTROL DEVICE, OPERATION INFORMATION COLLECTION METHOD FOR FLUID CONTROL DEVICE, AND COMPUTER EXECUTABLE PROGRAM

CROSS-REFERENCE

This application is a national phase of an international application, PCT/JP2020/043912 filed on Nov. 25, 2020, which claims the benefit of Japanese Application No. 2019-215303, filed on Nov. 28, 2019

TECHNICAL FIELD

The present invention relates to a technology for collecting operation information of a fluid control device.

BACKGROUND ART

Conventionally, a film forming process, for forming a thin film on a surface of a semiconductor wafer, has been required to achieve a finer thin film, and in this context, recently, a film forming method, known as Atomic Layer Deposition (ALD), capable of forming a thin film with a thickness at an atomic level or a molecular level has been employed.

However, microfabrication of such thin films requires fluid control devices to open and close more frequently than ever before, and loads may easily cause fluid leakage or the like. Thus, there is an increasing demand for technology that can easily detect fluid leakage in fluid control devices.

In addition, there is an increasing demand for fluid control devices and information collection methods that can not only easily detect leakage, but also collect various environmental factor information such as frequency of use of the fluid control devices, temperature, humidity, vibration, and the like, which have not been considered in the past and which affect the abnormality of the fluid control devices including above described leakage, analyze correlations with abnormalities, and utilize them to predict abnormalities.

In this regard, Patent Document 1 proposes a system that acquires operation information by a sensor attached to a fluid control device and analyzes the operation of the fluid control device based on the operation information.

CITATION LIST

Patent Documents

Patent Document 1: WO2018/168873A1

SUMMARY OF INVENTION

Technical Problem

In the system described in the Patent Document 1, operation information can be acquired from fluid control devices, but if the operation information is frequently acquired to improve accuracy of operation analysis, an amount of data becomes enormous and it becomes difficult to retain the operation information.

On the other hand, if the amount of data is reduced by simply narrowing down the timing of acquiring the operation information, it may not be possible to ensure the accuracy when performing analysis based on the operation information.

Therefore, one of the objects of the present invention is to ensure the accuracy of analysis based on the operation information while reducing the data amount of the operation information collected from the fluid control device.

Solution to Problem

In order to achieve the above objects, an operation information collection system for a fluid control device according to the present invention is a system collecting an operation information of the fluid control device having a detected value acquisition means acquiring a detected value of a state change or a device operation that is able to detect opening and closing operations from the fluid control device, a calculation processing means calculating a rate of change of detected values separated by a predetermined time based on the detected value, and an operation information registration means registering the rate of change of the detected values separated by the predetermined time to an operation information storage means as an operation information of the fluid control device.

Further, the calculation processing means calculates an average value of a rate of change of detected values at predetermined time intervals based on the detected value, and the operation information registration means registers the average value of the rate of change of the detected values at the predetermined time intervals to an operation information storage means as an operation information of the fluid control device.

Further, the calculation processing means may calculate a maximum value of a rate of change of detected values at predetermined time intervals, and the operation information registration means may register the maximum value of the rate of change of the detected values at the predetermined time intervals to an operation information storage means as an operation information of the fluid control device.

Further, the calculation processing means may calculate a rate of change in continuous detected values separated at a predetermined time by a predetermined threshold value of the detected value based on the detected value, and the operation information registration means may register the rate of change in the continuous detected values separated at the predetermined time by the predetermined threshold value of the detected value to an operation information storage means as an operation information of the fluid control device.

Further, the system may have a determination processing means referring to the operation information storage means, using a rate of change of detected values registered as operation information of the fluid control device as determination criteria, and determining whether the rate of change of detected values at predetermined time intervals exceed a threshold value set based on the predetermined determination criteria may be included, and the operation information registration means may register the rate of change of the detected values at the predetermined time intervals as operation information of the fluid control device when the rate of change of the detected values at the predetermined time intervals exceeds a predetermined threshold value that is set based on the predetermined determination criteria.

Further, the determination processing means may use a latest operation information among operation information stored in the operation information storage means as determination criteria.

Further, the operation information registration means may register only an operation information of the fluid control device during an opening and closing operation of the fluid control device.

Further, the system may have a specific processing means specifying a time when an opening and closing operation of the fluid control device is executed based on the detected value may be included, and the calculation processing means may set the time when an opening and closing operation of the fluid control device is executed as a target time for a calculation process.

Further, a fluid control device according to another aspect of the present invention is internally having the operation information collection system for the fluid control device described above as an operation information collection module.

Further, an operation information collection method for a fluid control device according to another aspect of the present invention is a method for collecting an operation information of the fluid control device, and a computer executes a detected value acquisition process acquiring a detected value of a state change or a device operation that are able to detect opening and closing operations from the fluid control device, a calculation process calculating a rate of change of detected values separated by a predetermined time based on the detected value, and an operation information registration process registering the rate of change of the detected values separated by the predetermined time to an operation information storage means as an operation information of the fluid control device.

Further, a computer executable program according to another aspect of the present invention is a computer executable program for collecting an operation information of the fluid control device for causing a computer to execute a detected value acquisition process acquiring a detected value of a state change or a device operation that are able to detect opening and closing operations from the fluid control device, a calculation process calculating a rate of change of detected values separated by a predetermined time based on the detected value, and an operation information registration process registering the rate of change of the detected values separated by the predetermined time to an operation information storage means as an operation information of the fluid control device.

The computer executable program can be provided by downloading via a network such as the Internet, or can be recorded and provided on various computer readable recording media.

Effect of the Invention

According to the present invention, the accuracy of the analysis based on the operation information can be secured while reducing the amount of data of the operation information collected from the fluid control device.

BRIEF DESCRIPTION OF DRAWINGS

FIG. 1 are diagrams illustrating a fluid control device for which operation information is collected in an operation information collection system for the fluid control device according to an embodiment of the present invention, and (a) is illustrating an external perspective view and (b) is illustrating a plan view of the fluid control device.

FIG. 13 are processing flow diagrams illustrating flows of processing executed by an operation information collection system for a fluid control device according to an embodiment of the present invention and illustrating another example of a case where processing by a specific processing unit does not intervene. (a) is illustrating a process of storing a detected value, and (b) is illustrating a process of calculating a rate of change.

FIG. 15 are processing flow diagrams illustrating flows of processing executed by an operation information collection system for a fluid control device according to an embodiment of the present invention and illustrating another example of a case where processing by a specific processing unit intervenes. (a) is illustrating a process of storing a detected value, and (b) is illustrating a process of calculating a rate of change.

PREFERRED EMBODIMENT

An operation information collection system for a fluid control device according to an embodiment of the present invention will be described below.

First, an example of the fluid control device for which operation information is to be collected will be described with reference to diagrams.

In the following description of the fluid control device, directions of members and the like may be referred to as up, down, left and right depending on directions on the diagrams for convenience, but it is not limited to these directions of the members and the like when the present invention is implemented or used.

Fluid Control Device V

Figure 2:
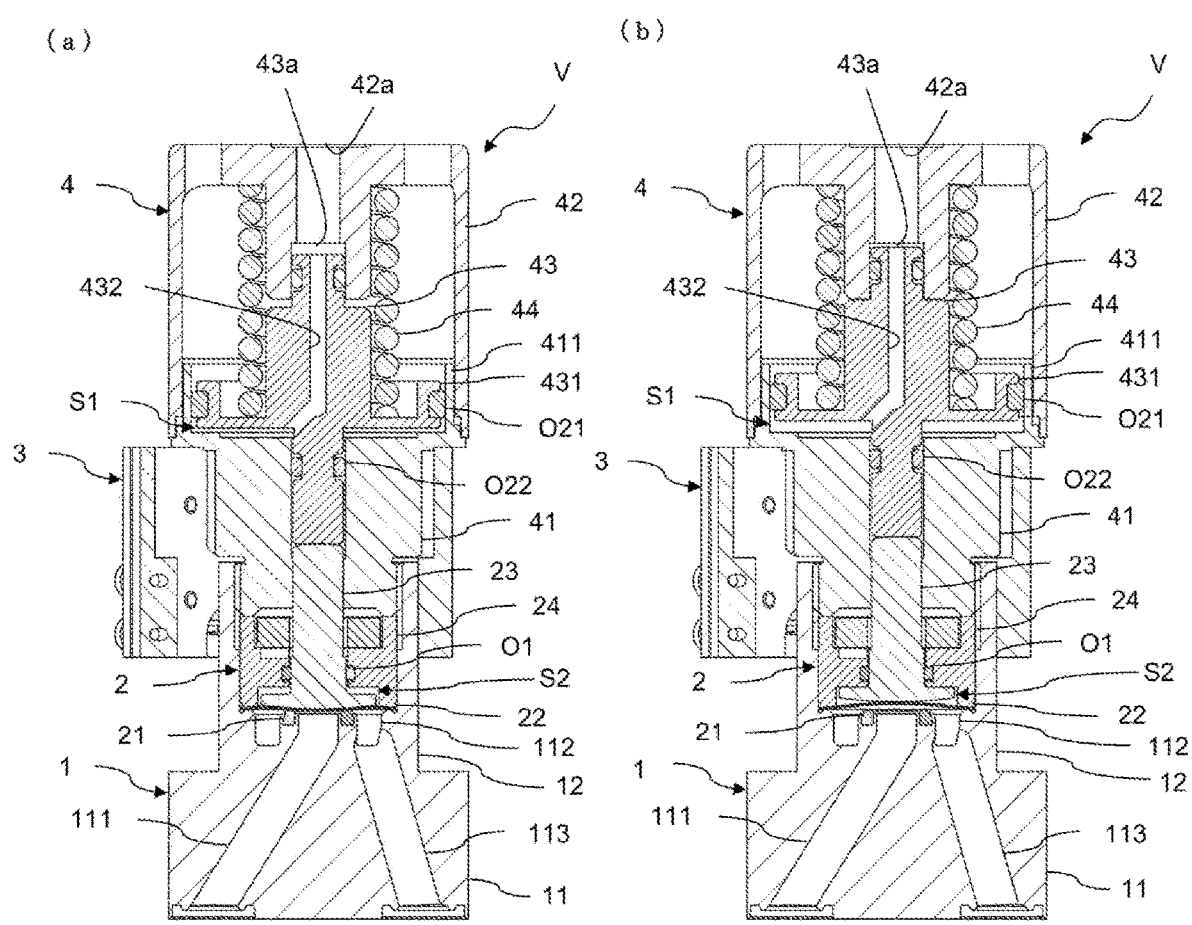
FIG. 2 are diagrams illustrating a cross-sectional view taken along line A-A of an internal structure of a fluid control device for which operation information is collected in an operation information collection system for the fluid control device according to an embodiment of the present invention, and (a) is illustrating a closing valve state and (b) is illustrating an opening valve state.
Figure 3:
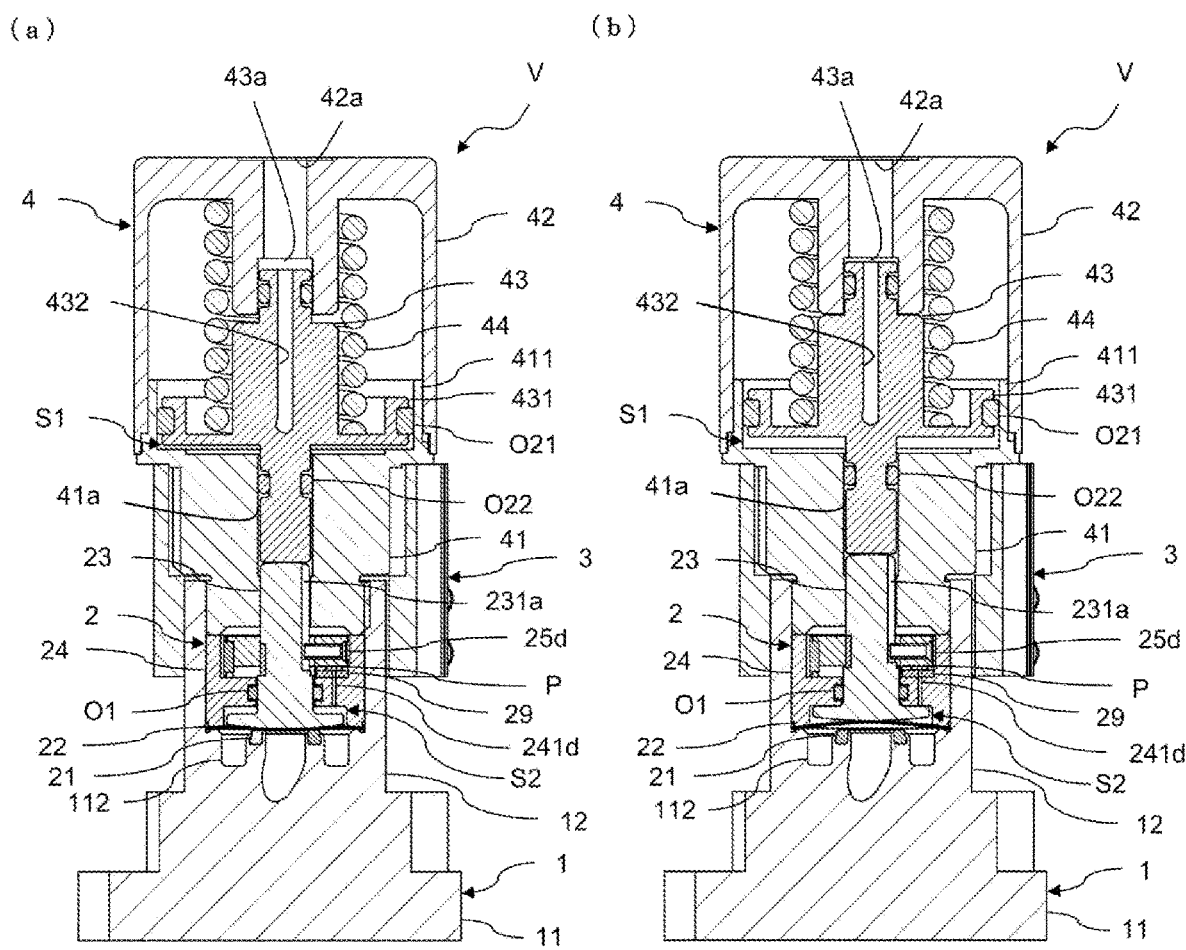
FIG. 3 are diagrams illustrating a cross-sectional view taken along line B-B of an internal structure of a fluid control device for which operation information is collected in an operation information collection system for the fluid control device according to an embodiment of the present invention, and (a) is illustrating a closing valve state and (b) is illustrating an opening valve state.

A fluid control device V illustrated in FIG. 1 is an air-operated direct diaphragm valve, constitutes a gas unit with other fluid control devices, flow rate control devices and the like, controls a process fluid, and processes an object to be processed. As illustrated in FIGS. 1 to 3, this fluid control device V includes a valve body 1, a bonnet part 2, a cover part 3, and an actuator part 4.

The valve body 1, as illustrated in FIG. 2 and FIG. 3, includes a base 11 where a flow path is formed and a cylindrical part 12 of substantially cylindrical shape provided on the base 11.

The base 11 is a rectangular shape in a plan view and becomes a part located on a substrate or a manifold block when it configures the gas unit by a plurality of fluid control devices V.

Figure 4:
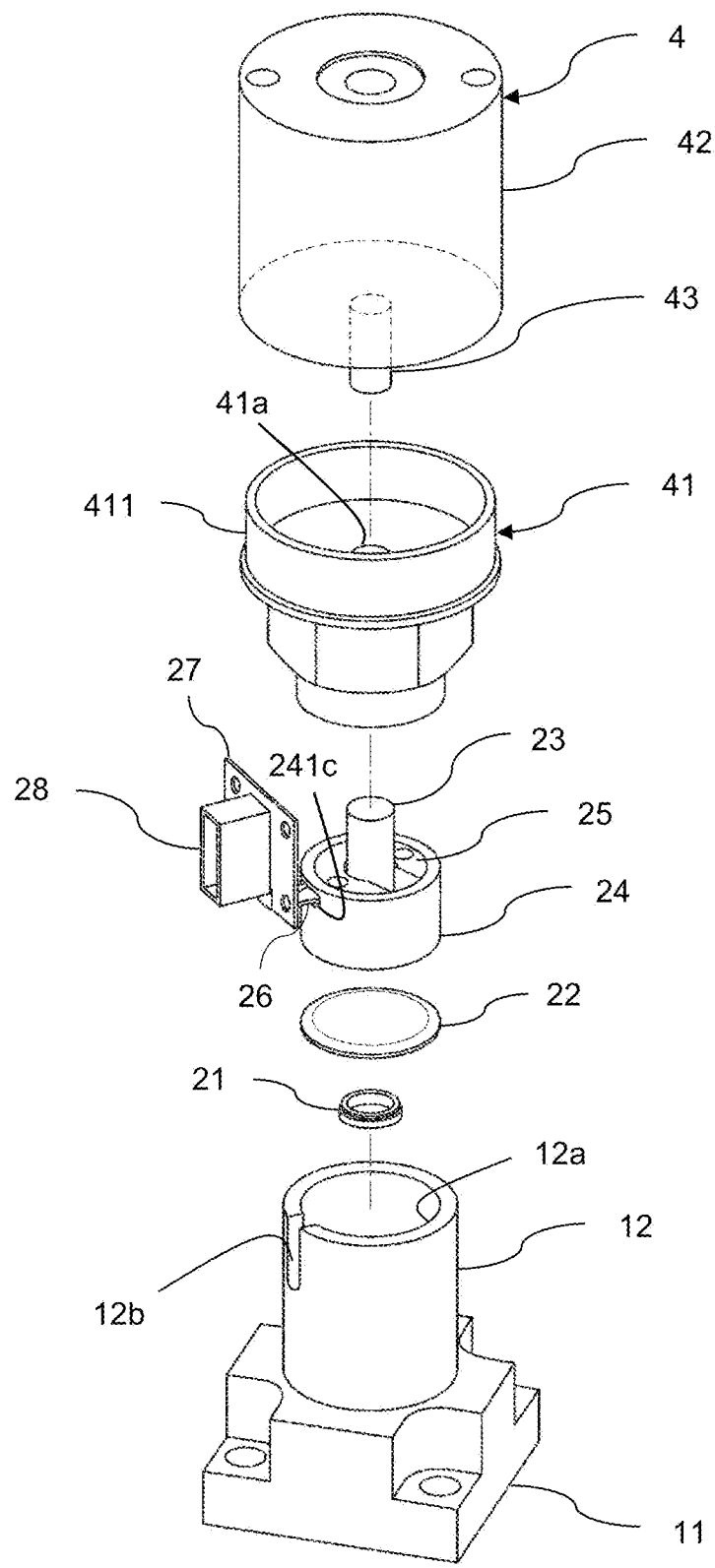
FIG. 4 is a diagram illustrating an exploded perspective view of a fluid control device for which operation information is collected in an operation information collection system for the fluid control device according to an embodiment of the present invention.

The cylindrical part 12, as illustrated in FIG. 4, is a hollow shape with an open-end face on a side where the bonnet part 2 is arranged, and inside of the hollow constitutes a recess 12a storing the bonnet part 2.

This cylindrical part 12 has a slit 12b, which has a length in an axial direction, which opens on one side opposite to the base 11 at a side where the bonnet part 2 is placed, and which is penetrated to a side of the recess 12a from the outside. A flexible cable 26 extending from a bonnet wall 25 through this slit 12b is led out from the inside to the outside.

Below the recess 12a and the inside of the base 11, an inflow path 111 where a fluid flows in, an outflow path 113 where the fluid flows out, and a valve chamber 112 connecting with the inflow path 111 and the outflow path 113, are formed. The inflow path 111, the outflow path 113, and the valve chamber 112 integrally constitute a flow path where the fluid flows.

The annular seat 21 is provided on an open periphery of an inflow path 111 in a valve chamber 112. By making the seat 21 brought into contact with and detached from the diaphragm 22, the fluid can flow from the inflow path 111 to the outflow path 113, or the flow can be blocked.

The diaphragm 22 is made of metal such as stainless steel or a NiCo-based alloy, is a spherical shell-shaped member with a convex central part, and separates the flow path from a space where the actuator part 4 operates. When the diaphragm 22 is not pressed by the diaphragm retainer 23, the diaphragm 22 is detached from the seat 21 as illustrated in FIG. 2(b) and FIG. 3(b), and the inflow path 111 and the outflow path 113 are in a connected state. On the other hand, in a state of being pressed by the diaphragm retainer 23, as illustrated in FIG. 2(a) and FIG. 3(a), a central part of the diaphragm 22 is deformed and brought into contact with the seat 21, and the inflow path 111 and the outflow path 113 are blocked.

The diaphragm retainer 23 is provided on an upper side of the diaphragm 22 and presses the central part of the diaphragm 22 in conjunction with a vertical movement of a piston 43.

Figure 5:
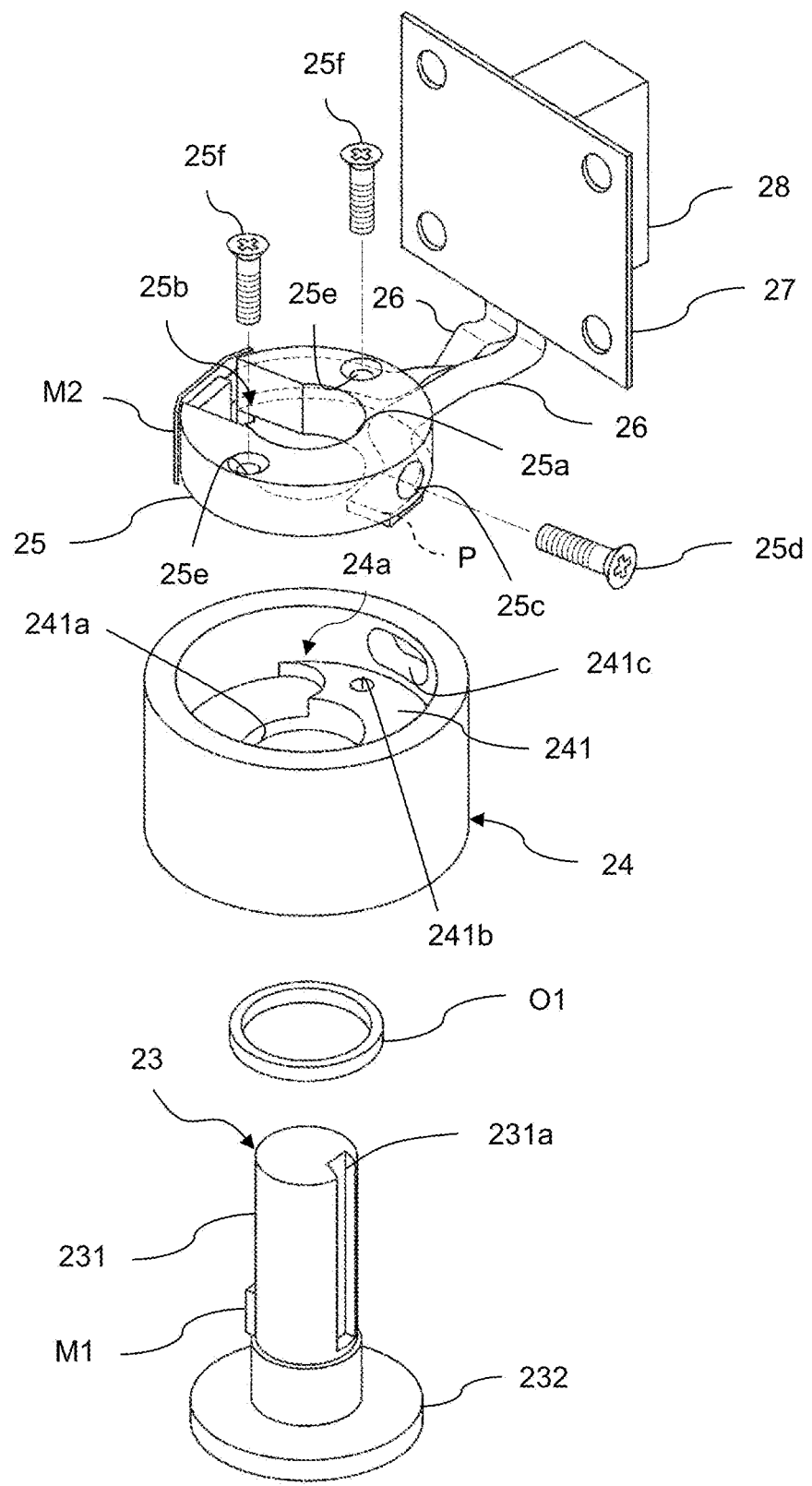
FIG. 5 is a diagram illustrating an exploded perspective view of a fluid control device for which operation information is collected in an operation information collection system for the fluid control device according to an embodiment of the present invention.

This diaphragm retainer 23, as illustrated in FIG. 5, includes a substantially cylindrical base body 231 and an increased diameter portion 232, where a diameter is increased at one end side that is brought into contact with the diaphragm 22.

A groove 231a, having a length in an axial direction and one end open on a side opposite to the increased diameter portion 232, with a bottom is formed on the base body 231. A shank part of a screw 25d, screwed into a screw hole 25c of the bonnet wall 25, fits slidably within this groove 231a. The groove 231a and the screw 25d constitute a rotation regulator regulating circumferential rotation of the diaphragm retainer 23. As a result, the diaphragm retainer 23 is regulated the circumferential rotation while vertically moving in conjunction with the piston 43.

Further, a magnet M1 is attached to the base body 231. This magnet M1 is attached to an opposite side of the groove 231a of the base body 231 in this embodiment, but it is possible to attach to other positions on the base body 231 as long as a position sensor M2 has no problem detecting a magnetic force of the magnet M1 and the fluid control device V has no problem with the operation.

The bonnet 24 is substantially cylindrical, and is stored in the recess 12a of the valve body 1.

A periphery of the diaphragm 22 is supported between a lower end of the bonnet 24 and the valve body 1, and this part forms a seal between the diaphragm 22 and the valve body 1.

A substantially disk-shaped partition 241, where a penetration hole 241a is formed in a center and the diaphragm retainer 23 is penetrated to the penetration hole 241a, is provided inside of the bonnet 24.

The bonnet wall 25 is stored in a recess 24a, formed above the partition 241 or on a side where the actuator part 4 is arranged. Screw holes 241b and through holes 25e are provided in each of the partition 241 and the bonnet wall 25 at positions corresponding to each other, and the bonnet wall 25 is screwed to the bonnet 24 by a bolt 25f.

The partition 241 of the bonnet 24 has a certain thickness, and an O-ring O1 is interposed between an inner peripheral surface of the penetration hole 241a formed in the partition 241 and the diaphragm retainer 23. As a result, the closed space S2 defined by the partition 241, the diaphragm 22 and the diaphragm retainer 23 is airtight.

Further, a connection hole 241d, connected to a pressure sensor P installed in the bonnet wall 25, is provided in the partition 241 of the bonnet 24. Since the pressure sensor P is provided through the connection hole 241d, a pressure inside of a closed space S2 defined by the partition 241, the diaphragm 22, and the diaphragm retainer 23, is possible to be measured.

Furthermore, on a side of the bonnet 24, a through hole 241c is provided for leading the flexible cable 26, leading from the bonnet wall 25 stored inside, to the outside.

The bonnet wall 25 is a member arranged in the bonnet 24. This bonnet wall 25 has a shape that is a thick substantially disk-shaped member hollowed out in a C-shape in a plan view. In a center of the bonnet wall 25, a penetration hole 25a is provided to penetrate the base body 231 of the diaphragm retainer 23. In addition, an opening 25b is provided to open the penetration hole 25a to an outward in a radial direction of the bonnet wall 25.

The screw hole 25c, threaded outward in a radial direction from the penetration hole 25a, is formed at a predetermined location of a thick part of the bonnet wall 25. The screw 25d is screwed into this screw hole 25c from the outside, and an axial part of the screwed screw 25d comes out to the penetration hole 25a and slidably fits to the groove 231a of the diaphragm retainer 23 penetrated to the penetration hole 25a.

The through hole 25e is provided in the bonnet wall 25 at a position corresponding to the screw hole 241b of the bonnet 24. The bolt 25f is screwed into the screw hole 241b and the through hole 25e with the bonnet wall 25 arranged on the partition 241 of the bonnet 24, whereby the bonnet wall 25 is fixed to the bonnet 24.

In a vicinity of the opening 25b of an outer peripheral surface of the bonnet wall 25, a flat plate shaped position sensor M2 is fixed so as to cover the opening 25b. This position sensor M2 is a magnetic sensor sensing a change in a distance with the magnet M1 attached to the diaphragm retainer 23, and not only an opening and closing state of the fluid control device V but also an opening position can be measured by sensing. The position sensor M2 attached to the bonnet wall 25 is fixed to a predetermined position regardless of a vertical movement of the piston 43 and the diaphragm retainer 23 caused by the opening and closing operation of the fluid control device V.

Figure 6:
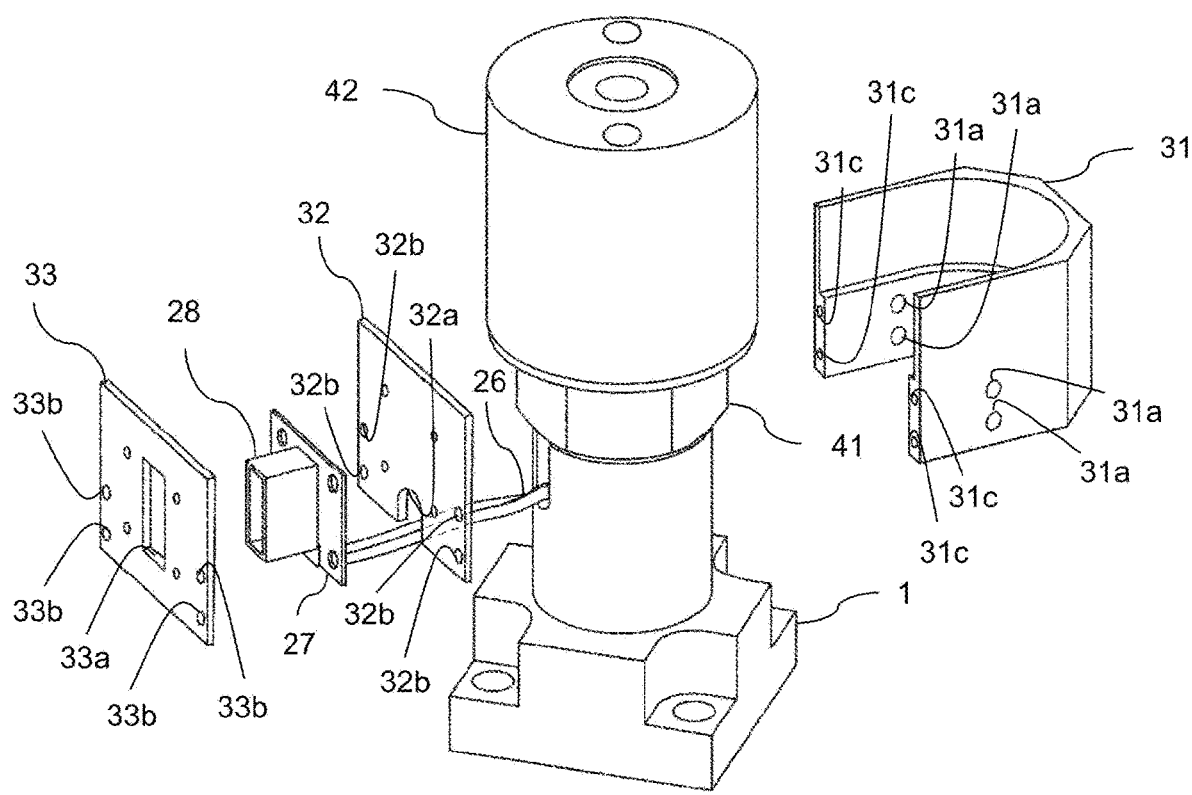
FIG. 6 is a diagram illustrating an exploded perspective view of a fluid control device for which operation information is collected in an operation information collection system for the fluid control device according to an embodiment of the present invention.

The cover part 3, as illustrated in FIG. 6, compresses and integrally holds an actuator body 41 and the valve body 1, and constitutes a fastener fastening a circuit board 27 and a connector 28, provided in the circuit board 27, to the fluid control device V.

This cover part 3 includes a cover 31 and flat plates 32 and 33.

The cover 31 is a substantially U-shaped, and the actuator body 41 and an end part of the valve body 1 is fitted inside of the cover 31.

Screw holes 31a are provided on both sides of the cover 31 corresponding to positions where the actuator body 41 is fitted. As a result, when screws 31b are screwed into the screw holes 31a with the valve body 1 fitted inside and a tip of the screws 31b are pressed against the valve body 1, the inside of the cover 31 is able to support the valve body 1 from both sides thereof.

Furthermore, the screw holes 31c are provided in a thick part of the cover 31. The plates 32 and 33 are installed to the cover 31 by screwing the screws 31d into the screw holes 31c via the through holes 32b and 33b of the plates 32 and 33.

The plates 32 and 33 are screwed and fixed to the cover 31 while the actuator body 41 and the end part of the valve body 1 are fitted inside of the cover 31, and compresses and holds the actuator body 41 and the valve body 1 between the cover 31 in the fixed state.

A notch 32a cut out a tongue-shape is formed below the plate 32, and the flexible cable 26 is lead via this notch 32a to the circuit board 27, where the connector 28 is provided.

The plate 33 is screwed and fixed to the plate 32 and the cover 31 while the circuit board 27 is interposed between the plate 32 and 33, and compresses and holds the circuit board 27 between the plate 32 and 33.

The plate 33 is provided with a substantially rectangular shaped through hole 33a in a central part, and the connector 28 provided in the circuit board 27 is lead to the outside from this through hole 33a.

The base 11 is in a rectangular shape in a plan view, and the cover part 3, as illustrated in FIG. 1(b), fixes the connector 28 to the fluid control device V in a diagonal direction of the rectangular base 11. The reason for fixing the connector 28 in this direction is as follows. When it constitutes the gas unit by a plurality of the fluid control devices V, it is preferable to align a direction of adjacent rectangular base 11 to eliminate intervals as much as possible, and it is preferable to arrange the fluid control device V on a substrate or a manifold block due to a demand for integration. On the other hand, when they are arranged and integrated in this way, it becomes difficult to connect terminals or the like to the connector 28. Thus, by directing the connector 28 in the diagonal direction of the base 11, it is possible to take a wider space for connection compared to point to the fluid control device V, located right next to it. As a result, it is easy to connect terminals and the like to the connector 28, it is possible to prevent problems such as disconnection due to broken or twisted terminals and the like, and it is possible to prevent problems that terminals come into contact with the fluid control device V to cause an abnormality in an operation of the fluid control device V.

The actuator part 4 is arranged above the bonnet part 2.

This actuator part 4, as illustrated in FIG. 4, includes the actuator body 41, an actuator cap 42, a piston 43, and a spring 44. Although the internal structure of the actuator part 4 is omitted in FIG. 4, the internal structure is illustrated in FIG. 2 and FIG. 3.

The actuator body 41 is interposed between the piston 43 and the bonnet 24.

As illustrated in FIG. 4, the actuator body 41 has a substantially cylindrical shape, and a penetration hole 41a where the piston 43 and the diaphragm retainer 23 is penetrated is provided along a length direction at a center. As illustrated in FIG. 2 and FIG. 3, the piston 43 is brought into contact with the diaphragm retainer 23 in the penetration hole 41a, and the diaphragm retainer 23 vertically moves in conjunction with a vertical movement of the piston 43.

A peripheral wall 411 having an annular projection is formed on an upper end surface on a side where the piston 43 is arranged, and a driving pressure introduction chamber S1, where a driving pressure is introduced, is formed between a flat horizontal surface inside of the peripheral wall 411 and a lower end surface of the increased diameter portion 431 of the piston 43.

Further, an external thread is threaded on an outer peripheral surface of a side where the piston 43 of the actuator body 41 is arranged, and the actuator body 41 is installed to one end of the actuator cap 42 by screwing the external thread to an internal thread threaded on an inner peripheral surface of the actuator cap 42.

A center of a length direction of the actuator body 41 is formed a substantially hexagonal shape in a cross-sectional view, a part of the substantially hexagonal shape in the cross-sectional view and an upper end part of the valve body 1 are integrally compressed by the cover 31.

The actuator cap 42 is a cap-shaped member, having an open lower end, and stores the piston 43 and the spring 44 inside.

An opening 42a, connecting to a driving pressure introduction path 432 of the piston 43, is provided in an upper end surface of the actuator cap 42.

A lower end of the actuator cap 42 is closed by screwing an upper part of the actuator body 41.

The piston 43 vertically moves in conjunction with supplying and stopping of the driving pressure, and the diaphragm 22 is brought into contact with and detached from the seat 21 through the diaphragm retainer 23.

A substantially center in an axial direction of the piston 43 is expanded in a disk-shape and constitutes the increased diameter portion 431. The piston 43 receives a bias of the spring 44 on an upper surface of the increased diameter portion 431. Further, the driving pressure introduction chamber S1 where the driving pressure is supplied is formed on a lower end of the increased diameter portion 431.

Furthermore, the driving pressure introduction path 432 is provided inside of the piston 43 to connect the opening 43a, formed on an upper end surface, to the driving pressure introduction chamber S1, formed on a lower end. The opening 43a of the piston 43 is connected to the opening 42a of the actuator cap 42, an introduction pipe introducing the driving pressure from the outside is connected to the opening 42a, and the driving pressure is supplied to the driving pressure introduction chamber S1 as a result.

An O-ring O21 is installed on an outer peripheral surface of the increased diameter portion 431 of the piston 43, and the O-ring O21 seals an outer peripheral surface of the increased diameter portion 431 and the peripheral wall 411 of the actuator body 41. Further, an O-ring O22 is installed on a lower end of the piston 43, and the O-ring O22 seals an outer peripheral surface of the piston 43 and an inner peripheral surface of the penetration hole 41a of the actuator body 41. The driving pressure introduction chamber S, connected to the driving pressure introduction path 432 in the piston 43 is formed by these O-rings O21 and O22, and an airtightness of this driving pressure introduction chamber S1 is ensured.

The spring 44 is wound around an outer peripheral surface of the piston 43, is brought into contact with an upper surface of the increased diameter portion 431 of the piston 43, and biases the piston 43 in a downward direction, such as a direction pushing down the diaphragm 22.

An opening/closing operation of the valve accompanying a supply and a stop of the driving pressure is described. When air is supplied from the introduction pipe (not illustrated in figures) connected to the opening 42a, the air is lead to the driving pressure introduction chamber S1 via the driving pressure introduction path 432 in the piston 43. In response, the piston 43 is pushed upward against the bias of the spring 44. As a result, the diaphragm 22 is detached from the seat 21, the valve is opened, and the fluid flows. On the other hand, when the air is not lead to the driving pressure introduction chamber S1, the piston 43 is pushed downward in accordance with the bias of the spring 44. As a result, the diaphragm 22 comes into contact with the seat 21, the valve is closed, and the fluid is blocked.

The fluid control device V includes the pressure sensor P and the position sensor M2 as an operation information acquisition mechanism to acquire the operation information in the device.

The pressure sensor P, as illustrated in FIG. 3, is installed to a lower surface of the bonnet wall 25 or a side of the flow path. The pressure sensor P is connected to the closed space S2 defined by the diaphragm 22, the partition 241, and the diaphragm retainer 23, of the bonnet 24 via the connection hole 241d. This pressure sensor P is constituted by a pressure-sensitive element, detecting a pressure change, and a conversion element and the like, converting a detected value of the pressure detected by the pressure-sensitive element to an electric signal. As a result, the pressure sensor P is possible to detect the pressure in the space defined by the diaphragm 22, the partition 241, and the diaphragm retainer 23, of the bonnet 24.

A packing 29 is interposed at a position where the pressure sensor P is connected to the connection hole 241d to ensure the airtightness.

The pressure sensor P may be a sensor to detect either a gauge pressure or an atmospheric pressure.

The position sensor M2 is not only able to get the opening and closing state of the fluid control device V, but also able to measure a valve lift by sensing a change in the distance with the magnet M1 attached to the diaphragm retainer 23.

The position sensor M2 can detect the opening/closing operation of the valve as follows. In other words, the position sensor M2 is fixed in the valve body 1 with the bonnet wall 25 and the bonnet 24 while the magnet M1 vertically moves in response to a vertical movement of the diaphragm retainer 23. As a result, based on a change of a magnetic field generated between the magnet M1 which vertically moves in accordance with the vertical movement of the diaphragm retainer 23 and the position sensor M2 in which the position is fixed, not only the operation of the diaphragm retainer 23 but also the opening and closing operation of the valve can be detected, and the valve lift can be measured.

Although various types of the position sensor M2 can be used, the position sensor M2 according to an example includes a planar coil, an oscillation circuit, and an integration circuit, and an oscillation frequency changes according to the change in the distance with the magnet M1 placed at an opposite position. Then, the valve lift can be measured with the opening and closing state of the fluid control device V by converting this frequency with the integrating circuit to obtain an integrated value.

In this embodiment, a magnetic sensor is used for the position sensor M2, but it is not limited thereto, and as with the position sensor M2 described above, if it is a position sensor that can measure a positional relationship between the diaphragm retainer 23 and the bonnet 24, or can measure a distance between these members, an optical position sensor or other types of sensors can be used.

Further, in the fluid control device V according to the present embodiment, it is desirable to select a position sensor including the position sensor M2, having a detection accuracy of a position falls within a range of ±0.01 mm to ±0.001 mm. The reason is as follows. A use of the detection accuracy exceeding ±0.001 mm results in a generation of false positive due to a detection of vibration generated by a vacuum pump or the like near the valve while fine opening degree control of about ±0.01 mm is required to realize fine fluid control.

In this embodiment, one end of the flexible cable 26 for communication with flexibility is connected to the pressure sensor P and the position sensor M2 respectively, and another end of the flexible cable 26 is connected to the circuit board 27 provided on the outside of the fluid control device V. The circuit board 27 is configured with a processing module sending and receiving the information, and thereby the information detected from the pressure sensor P and the position sensor M2 can be transmit toward the external terminal connected to the connector 28.

In the fluid control device V, a flexible printed circuits (FPC) is used for the flexible cable 26 and the circuit board 27, and the flexible cable 26, the circuit board 27, and the connector 28 are integrally configured. By using the flexible printed circuits to the flexible cable 26 and the circuit board 27, it is possible to use a space between the members as a wiring path. As a result, it is possible to reduce the size of the fluid control device V itself as compared to using covered wires.

Further, the processing module may be stored in the fluid control device V separately from the circuit board 27, or may be configured as a part of the pressure sensor P or the position sensor M2.

In addition, types and shapes of the connector 28 can be appropriately designed according to various standards.

Further, the operation information acquisition mechanism, accomplished by the pressure sensor P and the position sensor M2 described above, can also be arranged with a driving pressure sensor detecting a driving pressure, a temperature sensor measuring a temperature in the flow path, a limit switch detecting behaviors of the piston 43 or the diaphragm retainer 23, and the like.

In the fluid control device V described above, the piston 43 and the diaphragm retainer 23 are configured separately, but the magnet M1 is attached to the diaphragm retainer 23. Thus, a malfunction of the diaphragm retainer 23 can be determined. In other words, normally, the diaphragm retainer 23 rises following the piston 43 by a valve opening operation. However, when the valve is closed, the valve chamber 112 is depressurized to near the vacuum, so that the diaphragm 22 is attracted to the seat 21. As a result, even though the piston 43 rises, the diaphragm retainer 23 may not follow the piston 43 and may retain in contact with the diaphragm 22. As a result, the diaphragm 22 may keep the flow passage blocked. However, even in this case, in the fluid control device V, the magnet M1 is interlocked with the diaphragm retainer 23, so that the operation of the diaphragm retainer 23 can be determined from the value detected by the position sensor M2, and the operation failure can be determined.

The determination of the operation failure of the diaphragm retainer 23 is enabled because the position sensor M2 is attached to the bonnet wall 25 which does not move vertically like the piston 43 and the diaphragm retainer 23 according to the opening and closing operation of the fluid control device V, so that a relative operation of the diaphragm retainer 23 can be identified. Therefore, a member to which the position sensor M2 is to be attached may be fixed at a predetermined position regardless of opening and closing operation of the fluid control device V in that the operation of the diaphragm retainer 23 can be identified and the operation failure can be determined.

The fluid control device V may be provided with an information display means such as a liquid crystal panel for displaying the operation information. Further, a notification means for outputting a notification sound or emitting light may be provided in accordance with the processing result by a stored software.

A plurality of the fluid control devices V according to the above-described configuration are usually integrated to form a fluid controller (a gas unit) together with a flow rate controller and the like. In this way, when the fluid control device V is configured by the plurality of the fluid control devices V, the fluid control devices V are closely arranged. Therefore, when a panel for displaying data in each of the fluid control devices V is provided, it is preferable that the panel is provided at least on an upper surface of the actuator part 4 so as to be easily recognized.

First Embodiment

Operation Information Collection System

Figure 7:
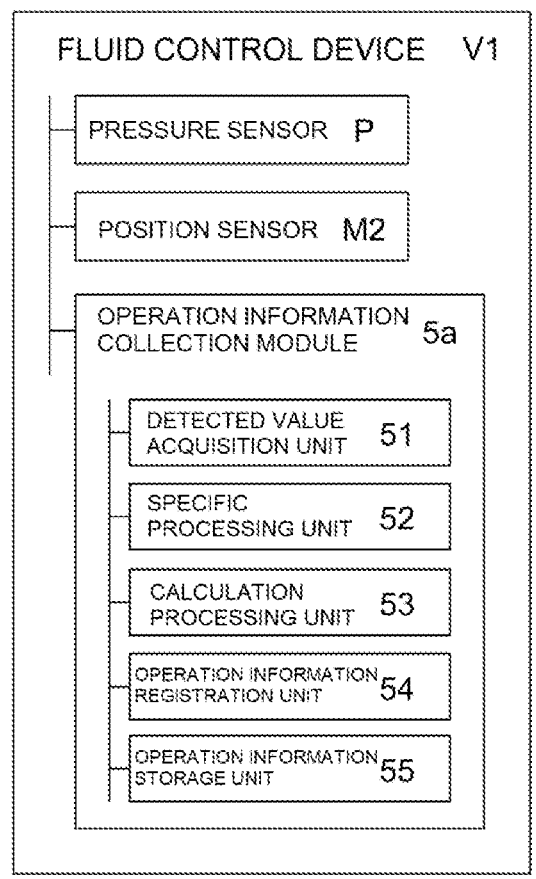
FIG. 7 is a functional block diagram illustrating structures of an operation information collection system for a fluid control device according to a first embodiment of the present invention.

FIG. 7 is illustrating a functional configuration of the fluid control device V1 in which the operation information collection system for the fluid control device according to the first embodiment is included as an operation information collection module 5a. A hardware configuration of the fluid control device V1 is the same as that of the fluid control device V described above. The fluid control device V1 has the pressure sensor P and the position sensor M2 for detecting a state change or a device operation that are able to detect the opening and closing operation, and a detected value detected by the pressure sensor P and the position sensor M2 is collected by the operation information collection module 5a.

The operation information collection module 5a constitutes a function block including a detected value acquisition unit 51, a specific processing unit 52, a calculation processing unit 53, an operation information registration unit 54, and an operation information storage unit 55.

The detected value acquisition unit 51 acquires a detected value of a device operation or a state change that can detect the opening and closing operation of the fluid control device V1. In the present embodiment, from the pressure sensor P and the position sensor M2 provided in the fluid control device V1, the detected value, which is related to a pressure of the closed space S2 detected by the pressure sensor P and a position of the diaphragm retainer 23 attached to the magnet M1 detected by the position sensor M2, is acquired.

FIGS. 8 to 11 are examples of graphs illustrating time changes of the detected value acquired by the detected value acquisition unit 51.

In the examples of these figures, a vertical axis is the detected value and illustrates the valve lift of the diaphragm retainer 23 detected by the position sensor M2, and a horizontal axis is a time and a unit of time is 1/1000 second (millisecond). The detected value related to the position is a detected result of a relative position of the diaphragm retainer 23 with respect to the bonnet wall 25, so that the opening position of the fluid control device V1 can be measured.

Further, regardless of the present embodiment, other values may be used as the detection value of the state change or the device operation that are able to detect opening and closing of the fluid control device V1, such as a pressure in the closed space S2 detected by the pressure sensor P and a driving voltage and a driving pressure at the time of opening and closing the fluid control device V1.

The specific processing unit 52 specifies the detected value at the time of executing the opening and closing operation of the fluid control device V1 with respect to the detected value. The opening and closing operation of the fluid control device V1 is specified based on the detected value acquired by the detected value acquisition unit 51. In other words, the specific processing unit 52 holds a predetermined threshold value for discriminating each of an opening valve and a closing valve, and specifies the timing before and after the detected value exceeds the predetermined threshold value.

The calculation processing unit 53 calculates rate of change of the detected value separated by the predetermined time based on the detected value.

Here, examples of four executing patterns for calculating the rate of change of the detected value will be described with reference to FIGS. 8 to 11. As described above, the vertical axis illustrates the valve lift of the diaphragm retainer 23 detected by the position sensor M2 and the horizontal axis illustrates time in each of the figures.

Figure 8:
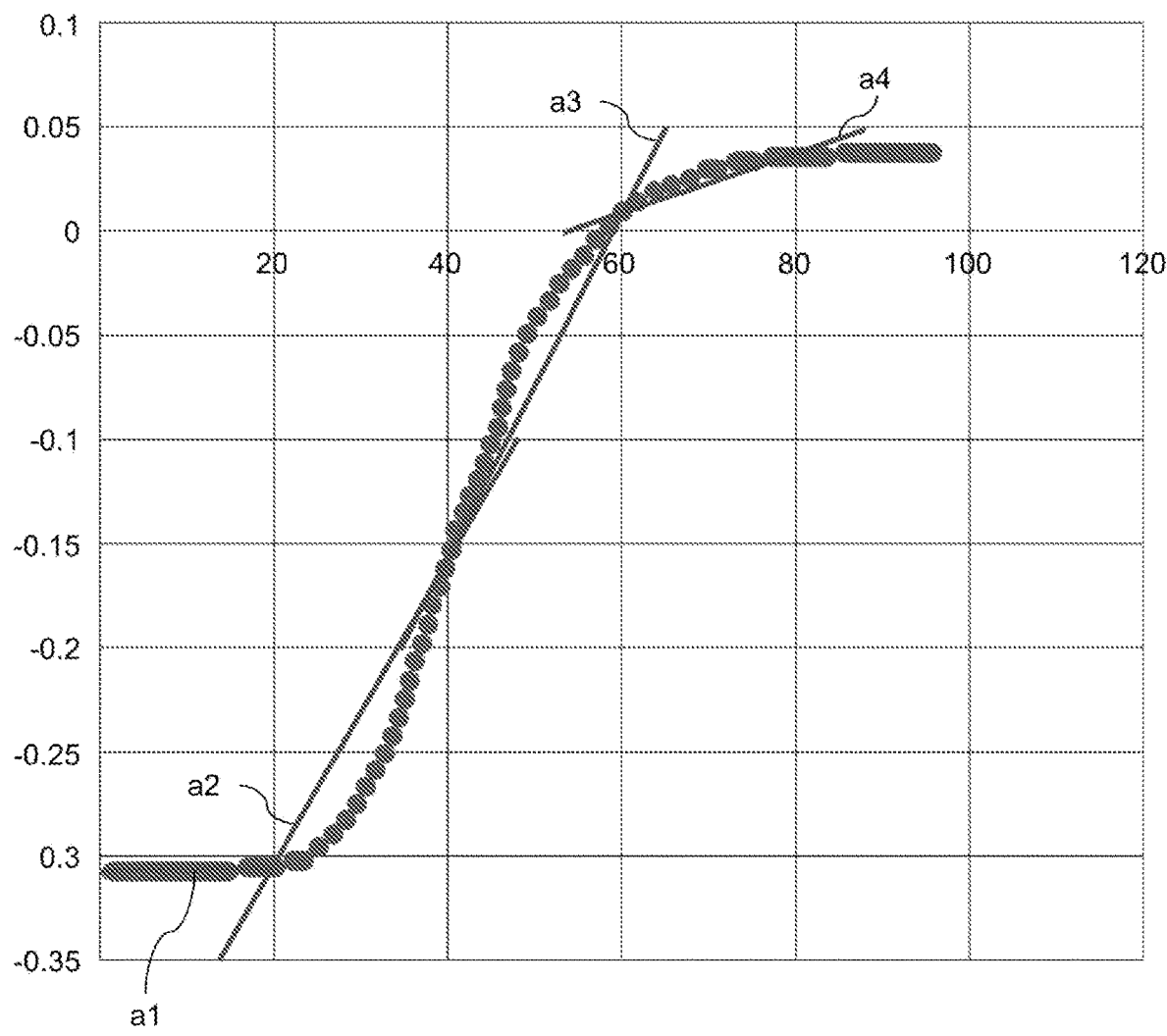
FIG. 8 is a graph for demonstrating an example of a collected operation information and a calculated rate of change in an operation information collection system for a fluid control device according to an embodiment of the present invention.

In the example of FIG. 8, the detected value is separated by 20 [msec] and the rate of change of the detected value in each of the 20 [msec] is calculated. Straight lines a1 to a4 all indicate the rate of change of continuous detected values separated by a predetermined time. The rate of change illustrated here is an average rate of change at a predetermined time.

Figure 9:
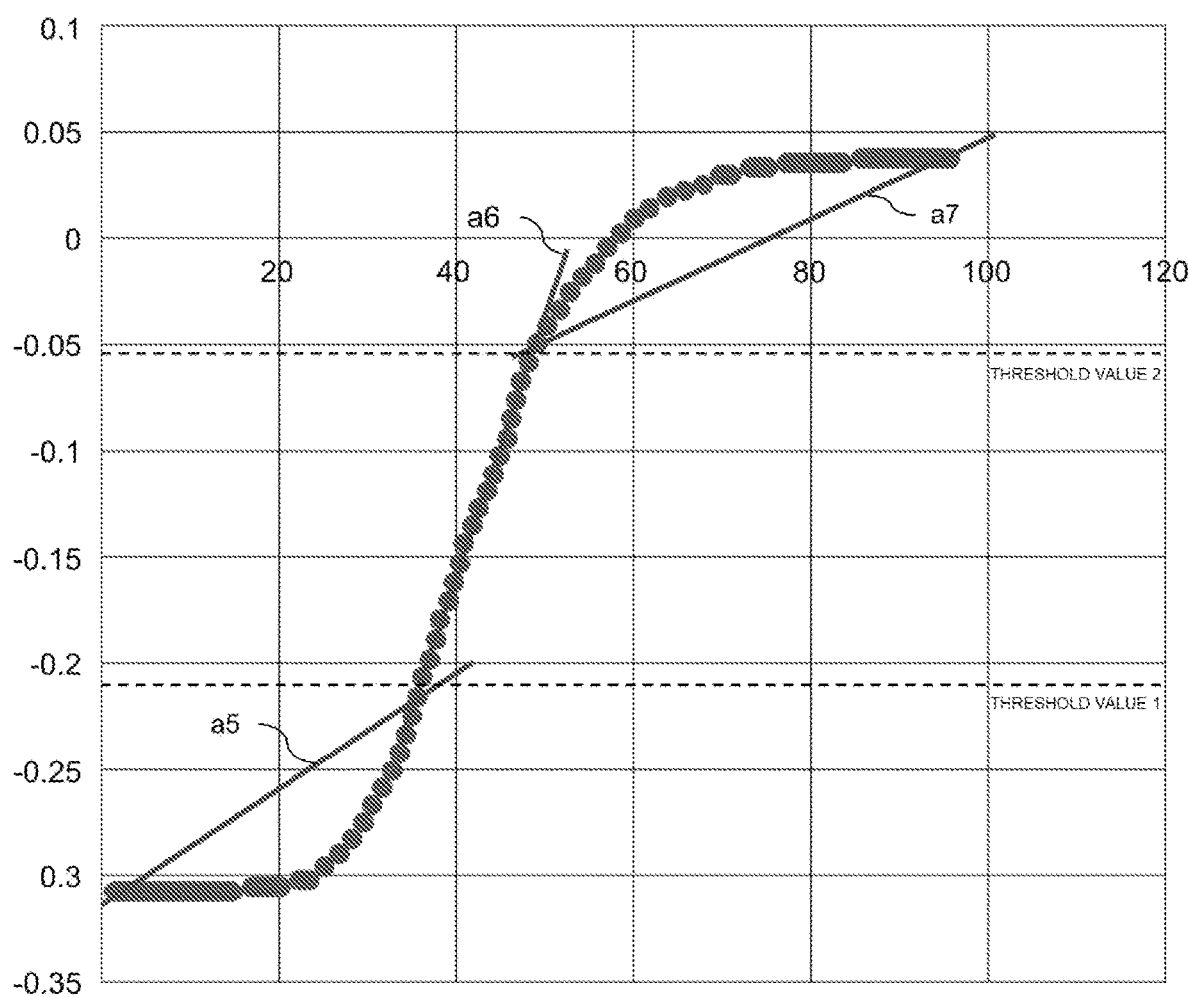
FIG. 9 is a graph for demonstrating an example of a collected operation information and a calculated rate of change in an operation information collection system for a fluid control device according to an embodiment of the present invention.

In the example of FIG. 9, two-step threshold values with a first threshold value and a second threshold value are set as detected values. Straight lines a5 to a7 respectively indicate a rate of change in continuous detected values separated at a time zone which is less than the first threshold value, more than the first threshold value and less than the second threshold value, or more than the second threshold value. The rate of change illustrated here is an average rate of change at a predetermined time.

Figure 10:
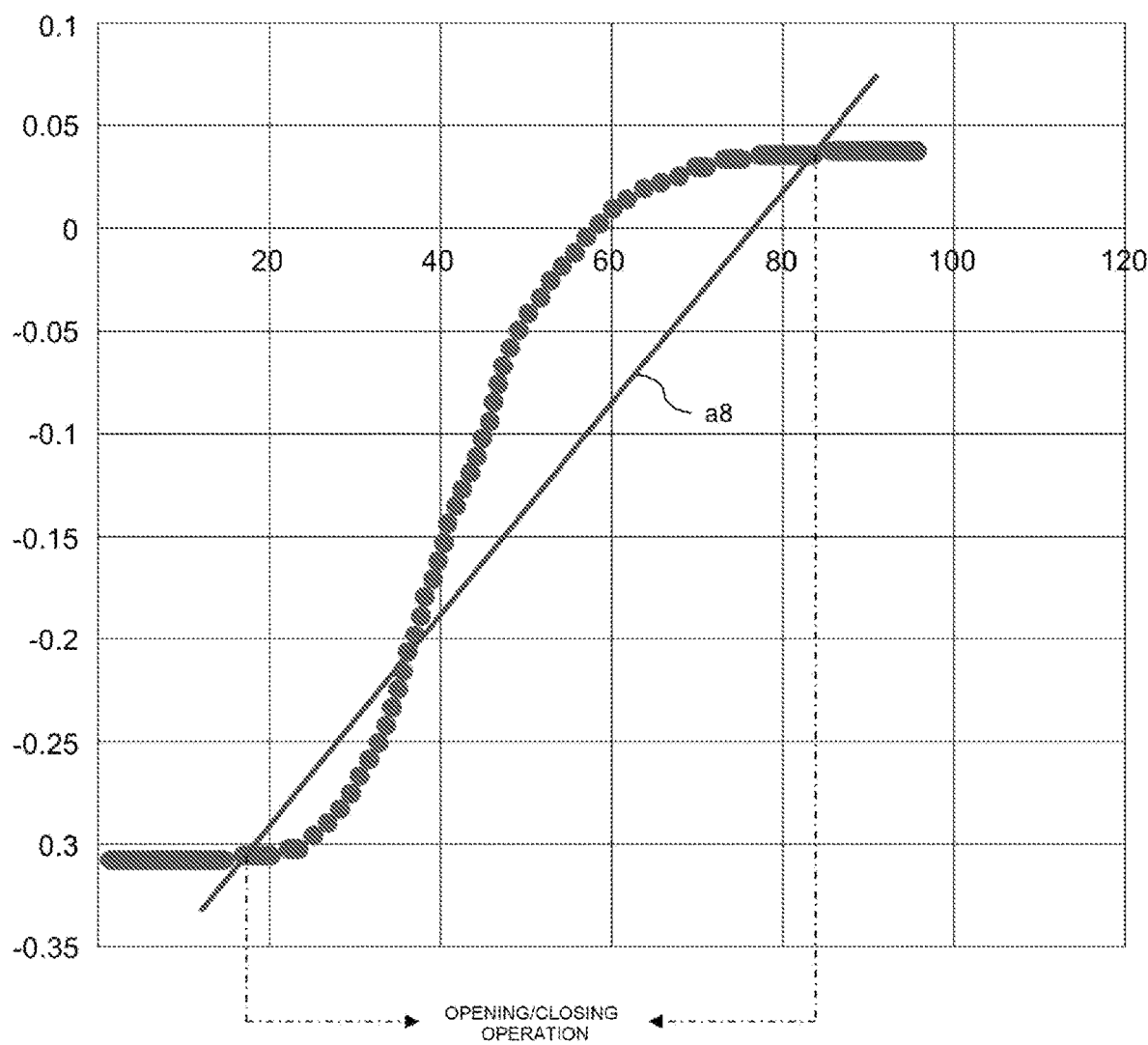
FIG. 10 is a graph for demonstrating an example of a collected operation information and a calculated rate of change in an operation information collection system for a fluid control device according to an embodiment of the present invention.

In the example of FIG. 10, the timing of the opening and closing of the fluid control device V1 is specified by the specific processing unit 52. A straight line a8 illustrates a rate of change in continuous detected values at a time when one opening and closing operation is executed. The rate of change illustrated here is an average rate of change at a predetermined time.

Figure 11:
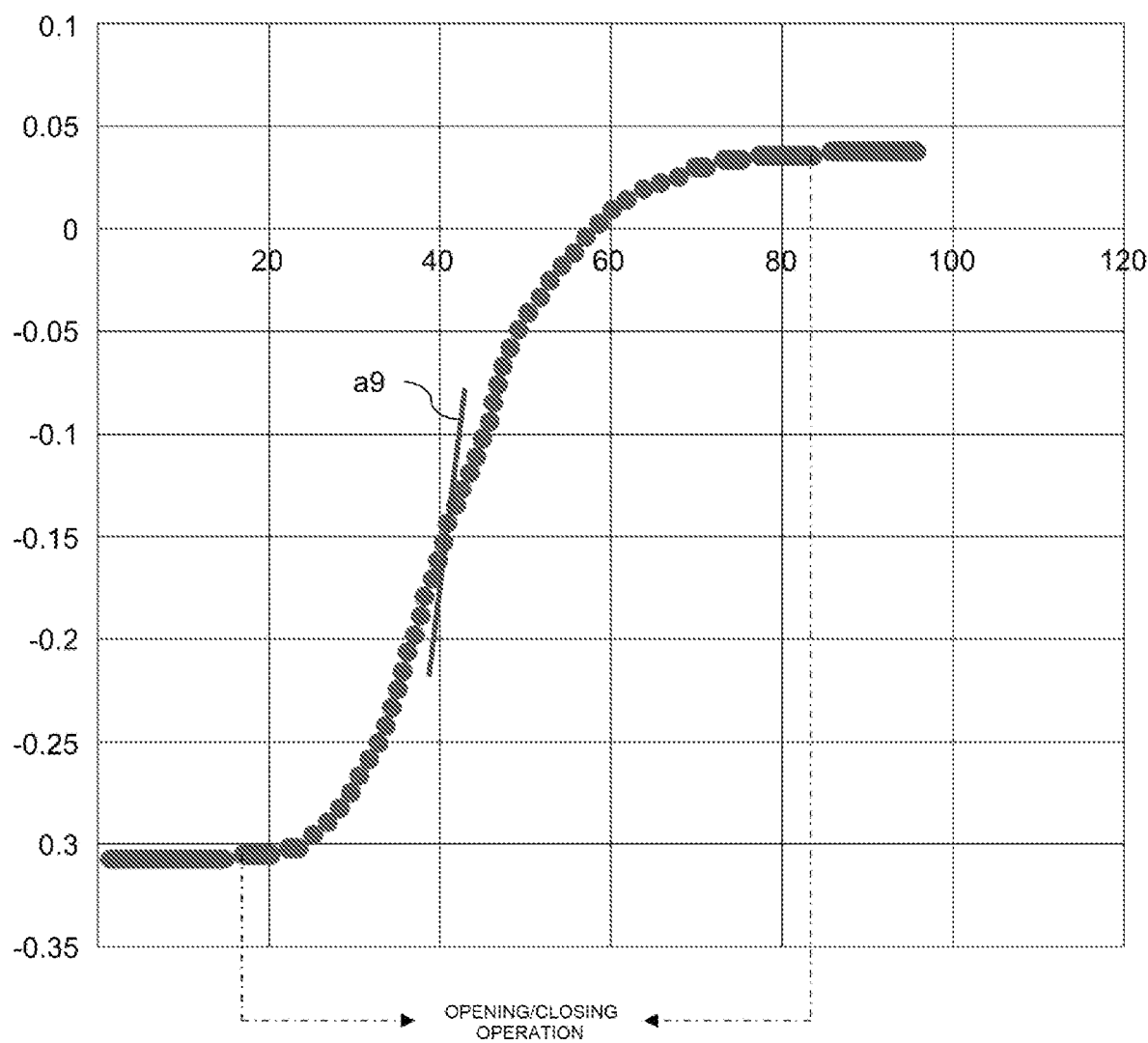
FIG. 11 is a graph for demonstrating an example of a collected operation information and a calculated rate of change in an operation information collection system for a fluid control device according to an embodiment of the present invention.

In the example of FIG. 11, similarly to the example of FIG. 10, the timing of the opening and closing of the fluid control device V1 is specified by the specific processing unit 52. On the other hand, a straight line a9 illustrates a maximum absolute value of a rate of change at a time when one opening and closing operation is executed. The rate of change illustrated here is a micro time and is a so-called derivative value.

The rate of change illustrated in FIGS. 8 to 11 is a calculation example by the calculation processing unit 53 according to the present embodiment, and a method for calculating the rate of change can be done by other methods as long as it is possible to reduce an amount of data by converting a set of detected values. Therefore, examples illustrated in FIGS. 8 to 11 may be suitably combined, the predetermined time illustrated in FIG. 8 may be a shorter time, or a predetermined threshold value may be added to the first threshold value and the second threshold value illustrated in FIG. 9.

In the examples of FIGS. 8 to 11, the valve lift of the diaphragm retainer 23 detected by the position sensor M2 is taken on the vertical axis, but regardless of this, it is also possible to calculate the rate of change by taking other values illustrating changes in operation or state of a fluid control device V2 as the vertical axis, such as a pressure value detected by the pressure sensor P and a temperature measured by a separately provided temperature sensor.

The operation information registration unit 54 registers the rate of change of the detected value separated by the predetermined time and calculated by the calculation processing unit 53 as the operation information of the fluid control device V1 to the operation information storage unit 55.

The registration of the operation information by the operation information registration unit 54 may be registering the rate of change as the operation information after calculating the rate of change of the detected value by the calculation processing unit 53, or may be registering all of the detected value, registering the rate of change calculated at a predetermined timing, and deleting the detected value used for a calculation.

The operation information storage unit 55 is a storage to store the operation information of the fluid control device V1. In addition to the information related to the rate of change of the detected value separated by a predetermined time which is calculated by the calculation processing unit 53, an accompanying information related to the operation of the fluid control device V1, such as the pressure value detected by the pressure sensor P, the valve lift of the diaphragm retainer 23 detected by the position sensor M2 and the temperature measured by the separately provided temperature sensor, and a log information, such as a time when the detected value is acquired and a time when the operation information is acquired, may also be stored in this operation information storage unit 55. It is better to keep these accompanying information and log information in relation to the rate of change of the detected value, and by referring to them together with the rate of change of the detected value, the operation of the fluid control device V1 can be understood in more detail. Other examples of the accompanying information include a period of use of the fluid control device V1, temperature and humidity of an external environment of the fluid control device V1, a thrust of the piston 43, an average moving speed of the piston 43, a vibration, an internal stress and hardness of members constituting the fluid control device V1.

Processing Flows

Subsequently, flows of processing executed by the operation information collection system for the fluid control device according to the present embodiment will be described with reference to FIGS. 12 to 15.

Figure 12:
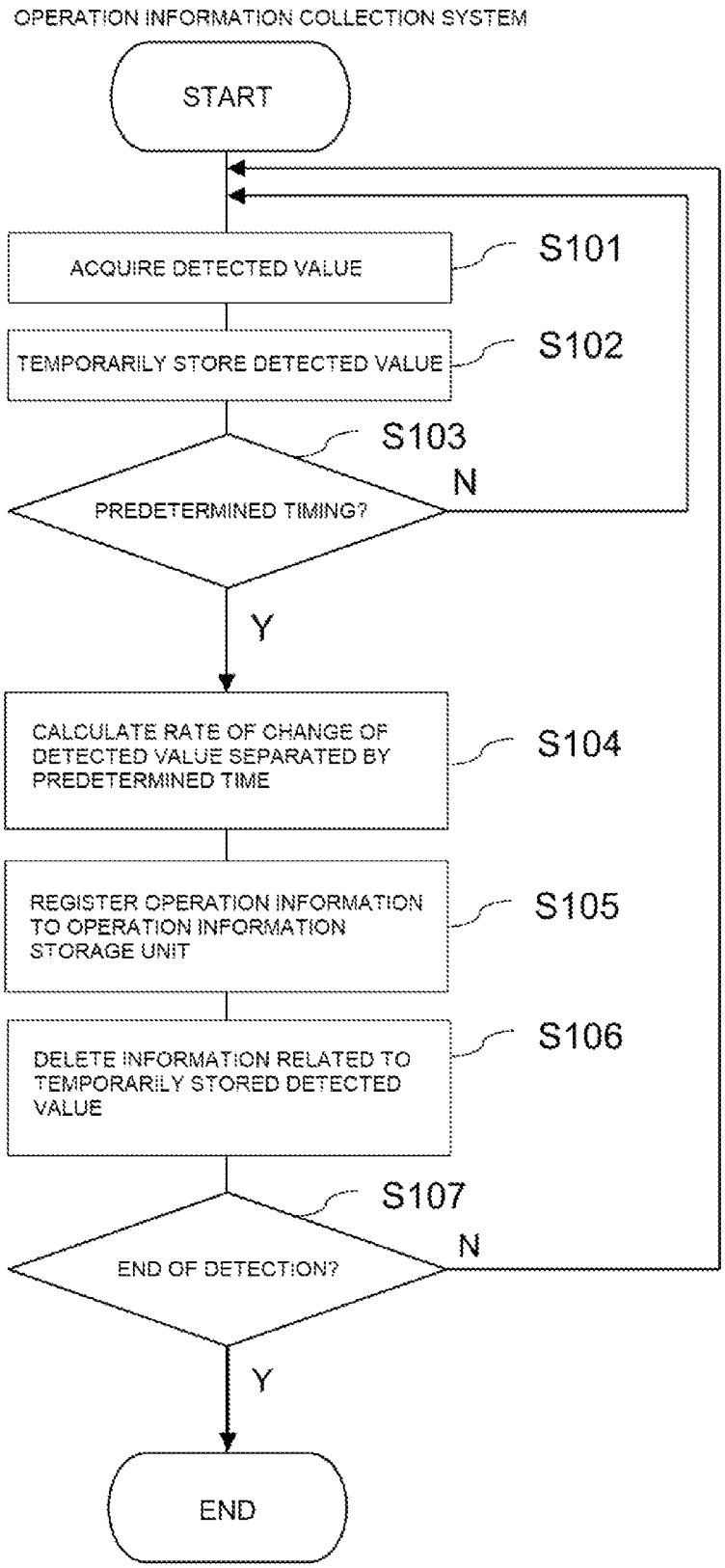
FIG. 12 is a processing flow diagram illustrating a flow of processing executed by an operation information collection system for a fluid control device according to an embodiment of the present invention and illustrating an example of a case where processing by a specific processing unit does not intervene.
Figure 14:
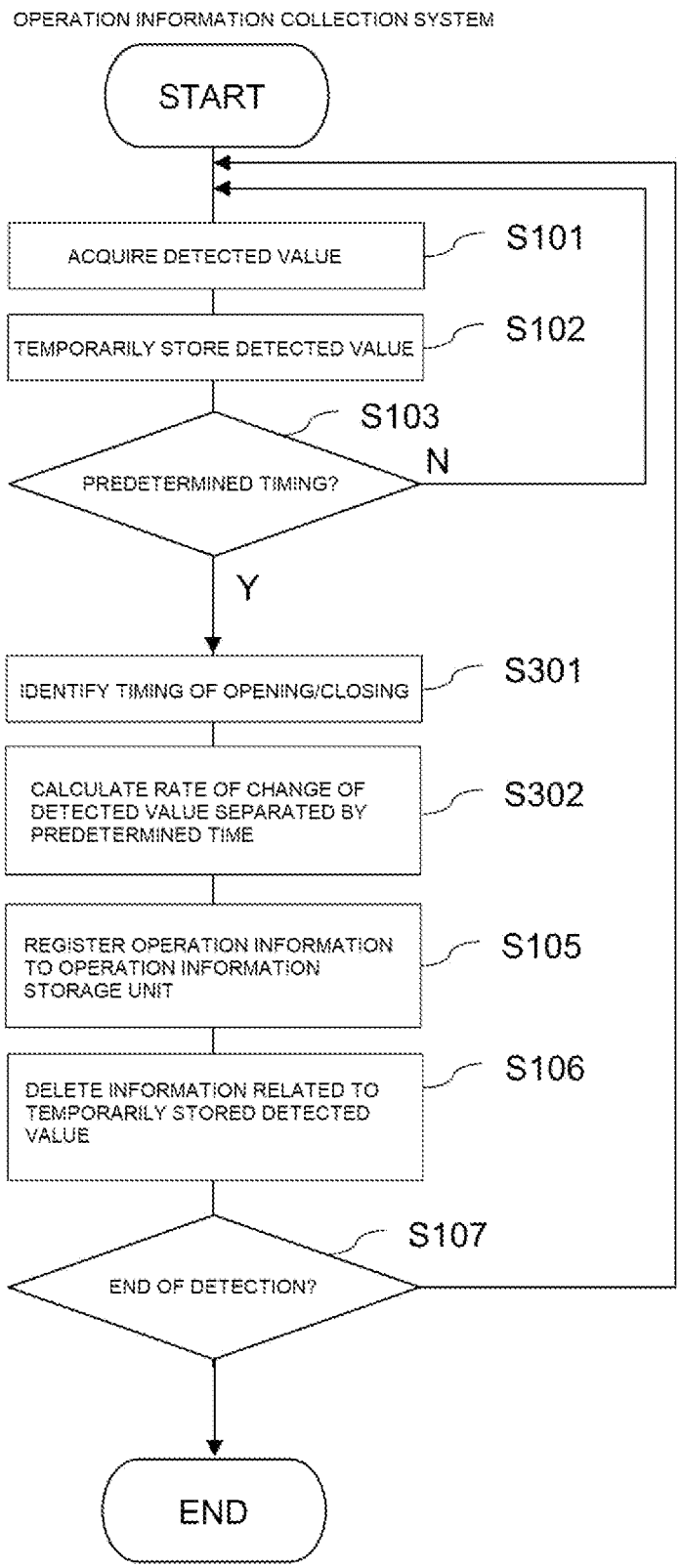
FIG. 14 is a processing flow diagram illustrating a flow of processing executed by an operation information collection system for a fluid control device according to an embodiment of the present invention and illustrating a case where processing by a specific processing unit intervenes.

FIGS. 12 and 13 illustrates a case where the processing by the specific processing unit 52 does not intervene (when the rate of change is calculated as in the examples of FIGS. 8 and 9), and FIGS. 14 and 15 illustrates a case where the processing by the specific processing unit 52 intervenes (when the rate of change is calculated as in the examples of FIGS. 10 and 11), but in both cases, the processing can be executed by the operation information collection module 5*a* included in the fluid control device V1.

First, an example of FIG. 12 will be described.

When a value related to a predetermined pressure and position is detected by the pressure sensor P and the position sensor M2 in the fluid control device V1, the detected value acquisition unit 51 acquires these detected values (S101). The detected values are temporally stored (S102), and at a predetermined timing (S103), the calculation processing unit 53 calculates a rate of change of the detected values separated by a predetermined time (S104). The predetermined timing referred to here is a timing at which the information related to the detected value necessary for calculating the rate of change of the detected value by the calculation processing unit 53 is prepared, and at this predetermined timing, the detected values for a predetermined time zone are obtained and the rate of change of the detected values at the predetermined time zone can be calculated.

The information related to the calculated rate of change is registered to the operation information storage unit 55 as the operation information by the operation information registration unit 54 (S105). In response, the information related to the detected value stored temporally is deleted (S106).

While a detection processing is executed, the processing above described is continuously executed (S107).

Next, an example of FIG. 13 will be described. In this example, the information related to the detected value is stored, and when the operation of the fluid control device V1 is terminated, when the fluid control device V1 is driven for a predetermined time, or when the amount of data held reaches a certain point, the rate of change of the detected value is calculated at a predetermined timing to reduce the amount of data.

In the fluid control device V1, when a value related to a predetermined pressure and position is detected by the pressure sensor P and the position sensor M2, the detected value acquisition unit 51 acquires these detected values (S201). The detected values are stored in a predetermined storage (S202), and the process related to acquiring and storing the detected value is continuously executed while the detection processing is executed (S203).

At an arbitrary timing, the calculation processing unit 53 refers to a predetermined storage unit in which the detected value is stored and calculates a rate of change of detected values separated by a predetermined time (S204). Information related to the calculated rate of change is registered to the operation information storage unit 55 by the operation information registration unit 54 (S205). In response, the information related to the detected value for which the rate of change is calculated is deleted from the predetermined storage, and the amount of data is reduced (S206).

Next, FIGS. 14 and 15 will be described. In this example, the specific processing unit 52 specifies a detected value corresponding to the timing of the opening and closing operation of the fluid control device V1, and calculates the rate of change with a time during which the opening and closing operation is executed as a target time of the calculation processing. Similar to the example of FIG. 12, FIG. 14 is an example of calculating the rate of change from the detected value as needed, and similar to the example of FIG. 13, FIG. 15 is an example of calculating the rate of change from the detected value at an arbitrary timing. FIGS. 14 and 15 respectively have the same reference numerals for the steps common to FIGS. 12 and 13.

First, in the example of FIG. 14, when the detected value acquisition unit 51 acquires the detected value (S101), the detected value is temporally stored (S102). When the predetermined timing comes (S103), the specific processing unit 52 specifies the timing of the opening and closing operation of the fluid control device V1 at the detected value (S301), and the calculation processing unit 53 calculates the rate of change of detected values separated by a predetermined time with a time during which the opening and closing operation is executed as a target time of the calculation processing (S302).

After that, the information related to the calculated rate of change is registered to the operation information storage unit 55 as the operation information by the operation information registration unit 54 (S105), and the information related to the temporally stored detected value is deleted (S106).

While the detection processing is being executed, the above process is continuously executed (S107).

In the example of FIG. 15, when the detected value acquisition unit 51 acquires the detected value (S201), the detected value is stored in a predetermined storage (S202). A process for acquiring and storing the detected value is continuously executed while the detection processing is being executed (S203).

At an arbitrary timing, the specific processing unit 52 refers to the predetermined storage and specifies the timing of the opening and closing operation of the fluid control device V in the detection value (S401), the calculation processing unit 53 calculates the rate of change of detected values separated by a predetermined time with a time during which the opening and closing operation is executed as a target time of the calculation processing (S204).

After that, the information related to the calculated rate of change is registered to the operation information storage unit 55 as the operation information by the operation information registration unit 54 (S205). In response, the information related to the detected value for which the rate of change is calculated is deleted from the predetermined storage and the amount of data is reduced (S206).

According to the operation information collection system for the fluid control device according to the present embodiment described above, the accuracy of analysis based on the operation information can be ensured while reducing the amount of operation information data collected from the fluid control device V1.

In particular, when analyzing the operation of the fluid control device V1, the information on the timing of the opening and closing operation is useful. However, by specifying the timing of the opening and closing operation of the fluid control device V1, a characteristic of the operation at the timing of the opening and closing operation can be retained without losing.

Regardless of the present embodiment, a part or all of the information related to the predetermined detected value in the fluid control device V1 may be supplied to the operation information collection device 6 not only from the fluid control device V1 itself but also from other devices. For example, it may be supplied from a terminal that measures the temperature or humidity of the place where the fluid control device V1 is installed, or it may be supplied as information input from an administrator terminal by an administrator of the fluid control device V1.

Second Embodiment

Operation Information Collection System

In a second embodiment, unlike the first embodiment described above, a calculated rate of change is registered as an operation information only when the calculated rate of change exceeds a threshold value set based on predetermined determination criteria. Hereinafter, this example will be described in detail.

Figure 16:
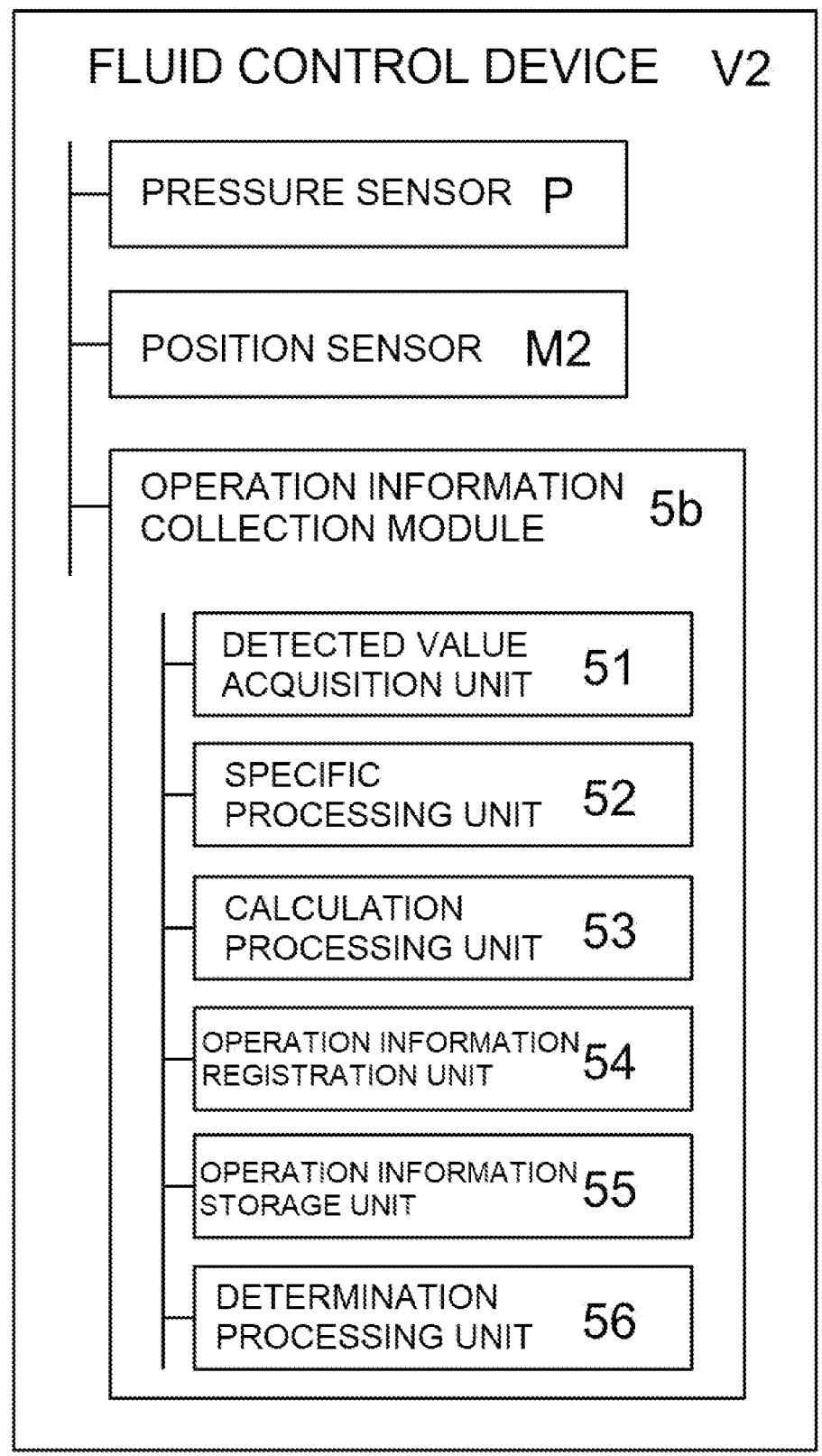
FIG. 16 is a functional block diagram illustrating structures of an operation information collection system for a fluid control device according to a second embodiment of the present invention.

FIG. 16 illustrates a functional configuration of the fluid control device V2 in which an operation information collection system for a fluid control device according to the second embodiment is included as an operation information collection module 5b. The hardware configuration of the fluid control device V2 is the same as that of the fluid control device V described above. Further, unless otherwise specified, functional units having the same reference numerals as the operation information collection system for the fluid control device according to the first embodiment, above described, are configured in the same manner as the corresponding functional units of the first embodiment.

The operation information collection module 5b includes a determination processing unit 56 in addition to the detected value acquisition unit 51, the specific processing unit 52, the calculation processing unit 53, the operation information registration unit 54 and the operation information storage unit 55, described above.

The determination processing unit 56 refers to the operation information storage unit 55, uses the rate of change of the detected value registered as an operation information of the fluid control device V2 as determination criteria, and determines whether the rate of change of the detected value separated by a predetermined time exceeds a threshold value which is set based on the predetermined determination criteria.

The operation information registration unit 54 executes registering of the operation information according to a result of a determination processing. In other words, when it is determined that the rate of change of the detected value separated by a predetermined time, calculated by the calculation processing unit 53, exceeds the threshold value set based on the predetermined determination criteria, the rate of change is registered to the operation information storage unit 55 as the operation information of the fluid control device V2. On the other hand, when it is determined that the rate of change of the detected value separated by a predetermined time, calculated by the calculation processing unit 53, does not exceed the threshold value set based on the predetermined determination criteria, the rate of change is not registered.

Processing Flows

Figure 17:
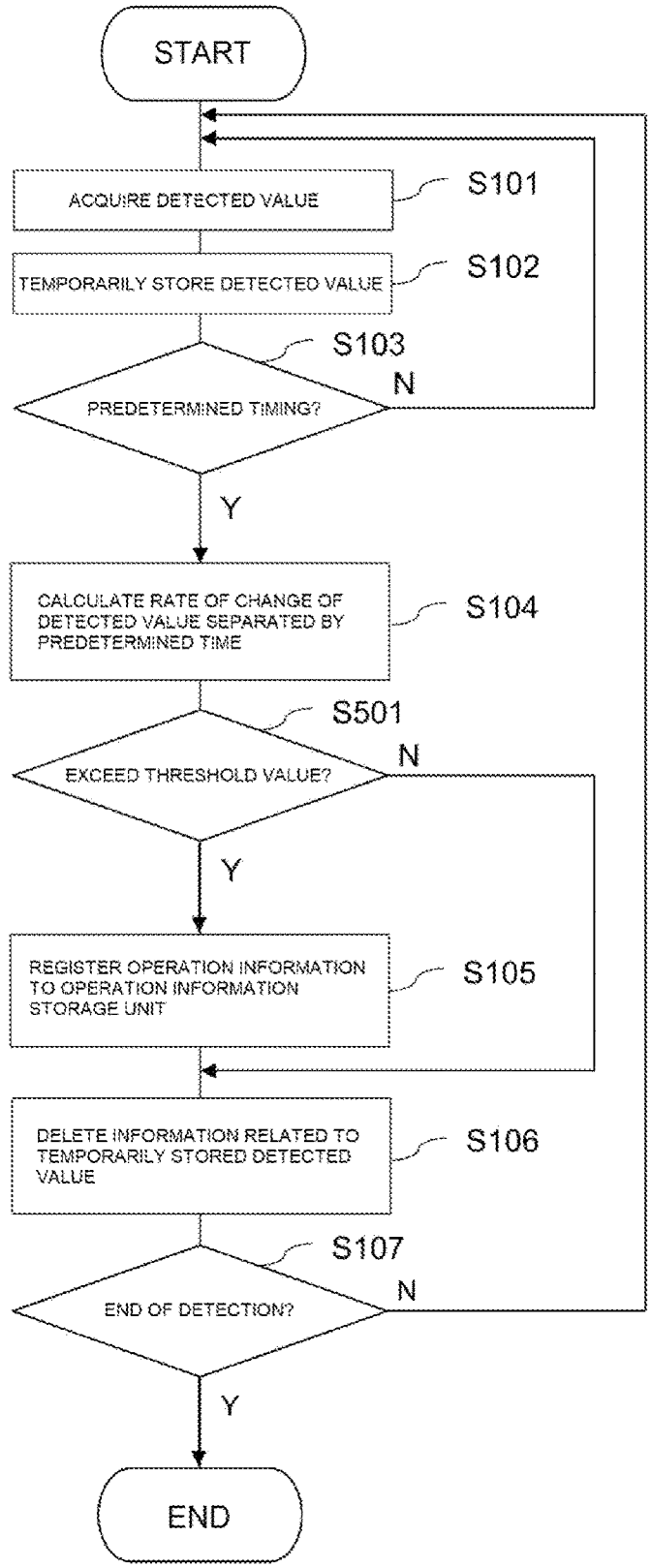
FIG. 17 is a processing flow diagram illustrating a flow of processing executed by an operation information collection system for a fluid control device according to a second embodiment of the present invention.

Subsequently, flows of processing executed by the operation information collection system for the fluid control device according to the present embodiment will be described with reference to FIG. 17. This embodiment will describe a modified example of the example described in FIG. 12 in which the processing by the specific processing unit 52 does not intervene. On the other hand, it is also possible to constitute a modified example of the examples described in FIGS. 13 to 15 in which the processing by the specific processing unit 52 intervenes. In the processing flow illustrated in FIG. 12, the processing given the same reference numerals as in FIG. 12 is the same as the corresponding processing in FIG. 12.

In this example, the calculation processing unit 53 calculates the rate of change of detected values separated by a predetermined time (S104) at a predetermined timing (S103), the determination processing unit 56 determines whether the calculated rate of change exceeds a threshold value set based on the predetermined determination criteria (S501). The predetermined determination criteria are the rate of change of the detected value registered in the operation information storage unit 55 as the operation information of the fluid control device V2.

When the determination processing unit 56 determines that the information related to the calculated rate of change exceeds a threshold value set based on the predetermined determination criteria, the operation information registration unit 54 registers the information related to the calculated rate of change to the operation information storage unit 55 as the operation information (S105). Hereinafter, the processes of S106 and S107 are executed in the same manner as described with reference to FIG. 12.

In response to the processing by the determination processing unit 56, a new operation information is registered to the operation information storage unit 55, but an operation information that is set as a predetermined determination criteria by the determination processing unit 56 may be an arbitrary determined operation information such as an operation registered as reference data in advance or an operation information acquired first, or may be the most recently registered operation information or the latest operation information.

Third Embodiment

Operation Information Collection System

In a third embodiment, unlike the second embodiment described above, a detected value is registered as an operation information only when the detected value exceeds a threshold value that is set based on a predetermined determination criteria. Hereinafter, this example will be described in detail.

Figure 18:
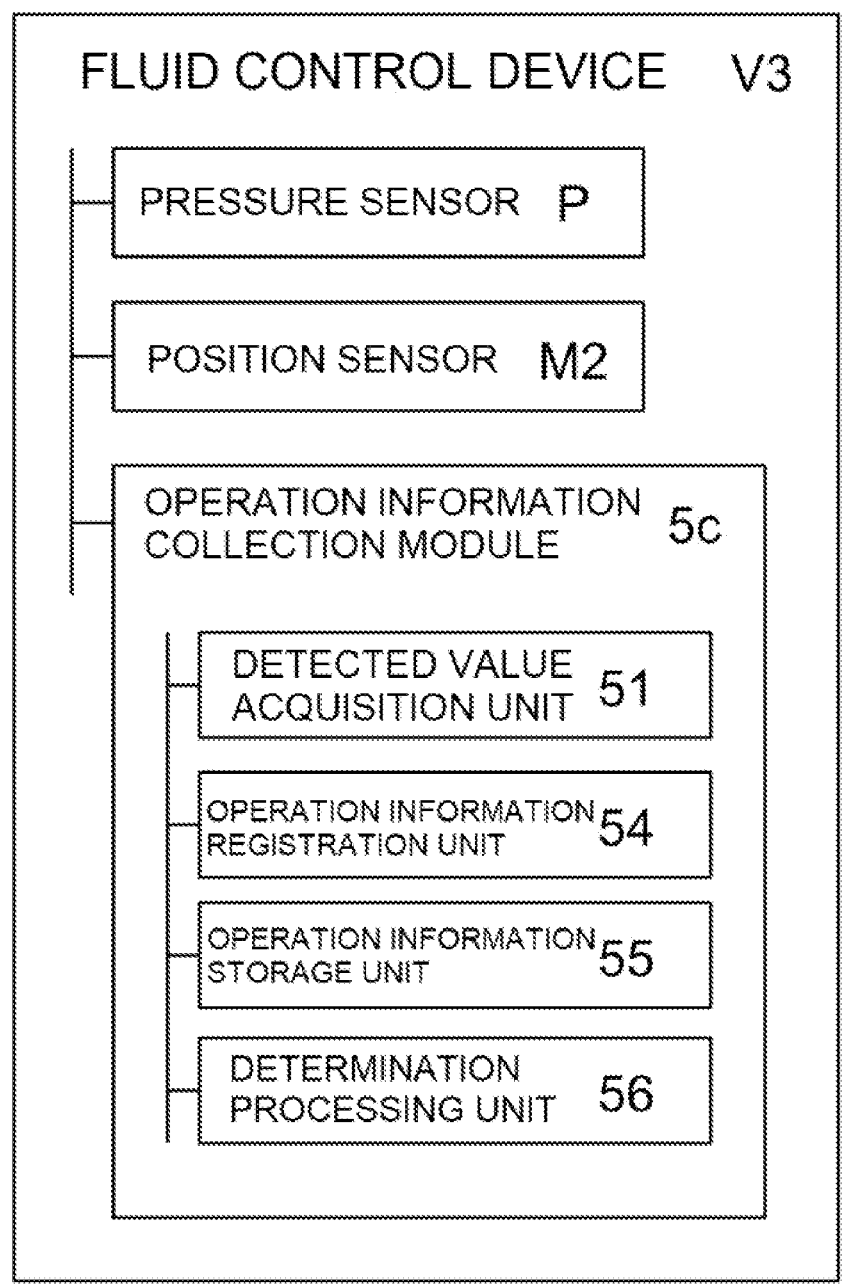
FIG. 18 is a functional block diagram illustrating structures of an operation information collection system for a fluid control device according to a third embodiment of the present invention.

FIG. 18 illustrates a functional configuration of the fluid control device V3 in which an operation information collection system for a fluid control device according to the third embodiment is included as an operation information collection module 5c, and the operation information collection module 5c includes the detected value acquisition unit 51, the operation information registration unit 54, the operation information storage unit 55, and the determination processing unit 56. Further, unless otherwise specified, functional units having the same reference numerals as the operation information collection system for the fluid control device according to the first embodiment and the second embodiment, above described, are configured in the same manner as the corresponding functional units of the first embodiment and the second embodiment.

The determination processing unit 56 refers to the operation information storage unit 55, uses the rate of change of the detected value registered as the operation information of the fluid control device V2 as determination criteria, and determines whether the rate of change of the detected value separated by a predetermined time exceeds a threshold value that is set based on the predetermined determination criteria.

Figure 19:
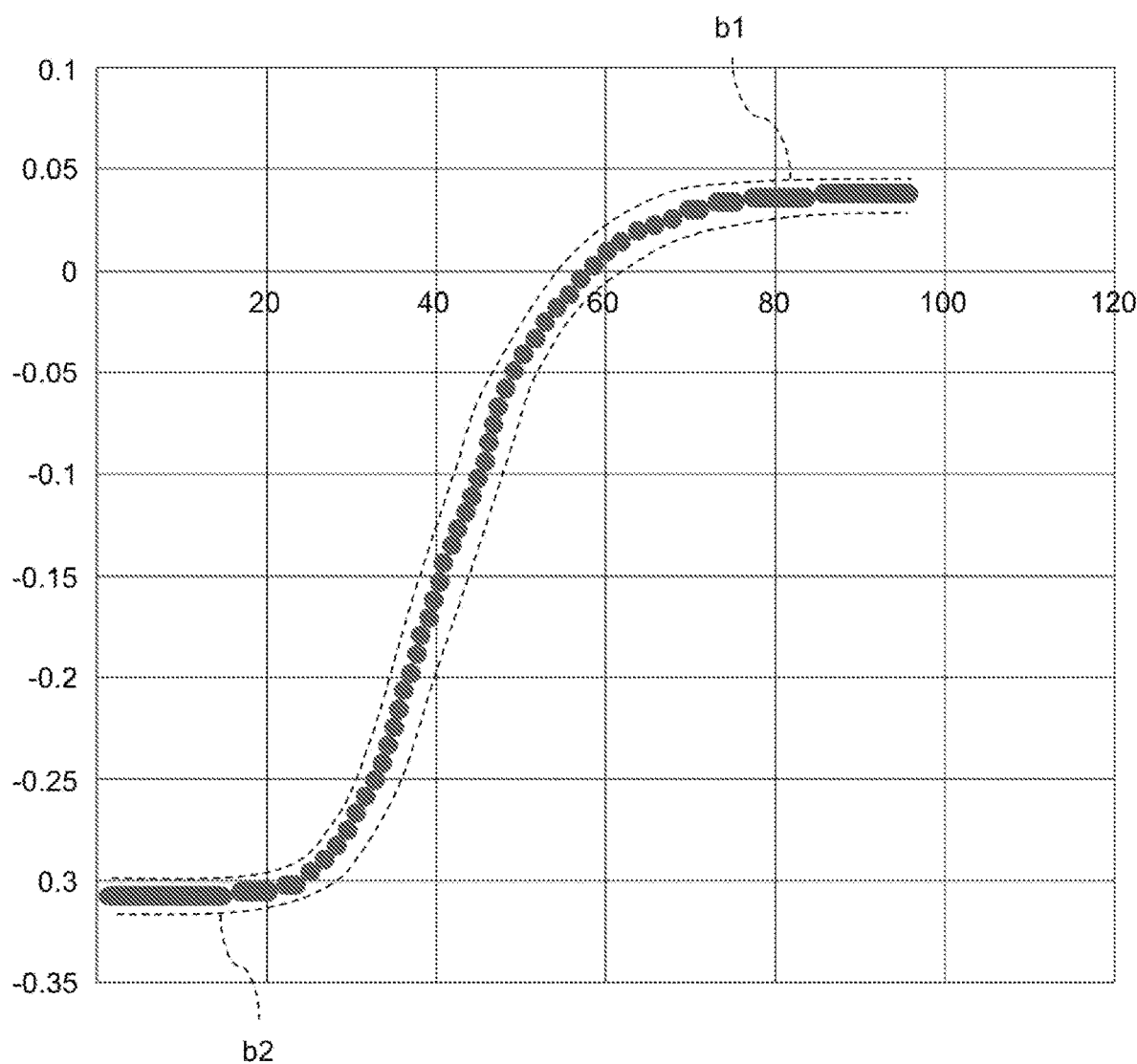
FIG. 19 is a graph for demonstrating an example of a detected value and a threshold value as determination criteria in an operation information collection system for a fluid control device according to a third embodiment of the present invention.

In other words, as illustrated in FIG. 19, a group of the detected values serving as determination criteria is retained, values within a certain range from the detected values are set as threshold values b1 and b2, and the detected values are determined whether to exceed the threshold values b1 and b2.

The operation information registration unit 54 registers the detected value to the operation information storage unit 55 as the operation information according to the result of a determination processing of the determination processing unit 56. In other words, when it is determined that the detected value acquired by the detected value acquisition unit 51 exceeds the threshold value that is set based on the predetermined determination criteria, the detected value is registered to the operation information storage unit 55 as the operation information of the fluid control device V2. On the other hand, when it is determined that the detected value does not exceed the threshold value that is set based on the predetermined determination criteria, the detected value is not registered.

The predetermined determination criteria are information related to the detected values registered to the operation information storage unit 55 as the operation information, but this information related to the registered detected value may be arbitrary defined operation information, such as a detected value as the operation information registered as a reference data in advance, or a detected value as the first acquired operation information, or may be the most recently registered operation information.

Processing Flows

Figure 20:
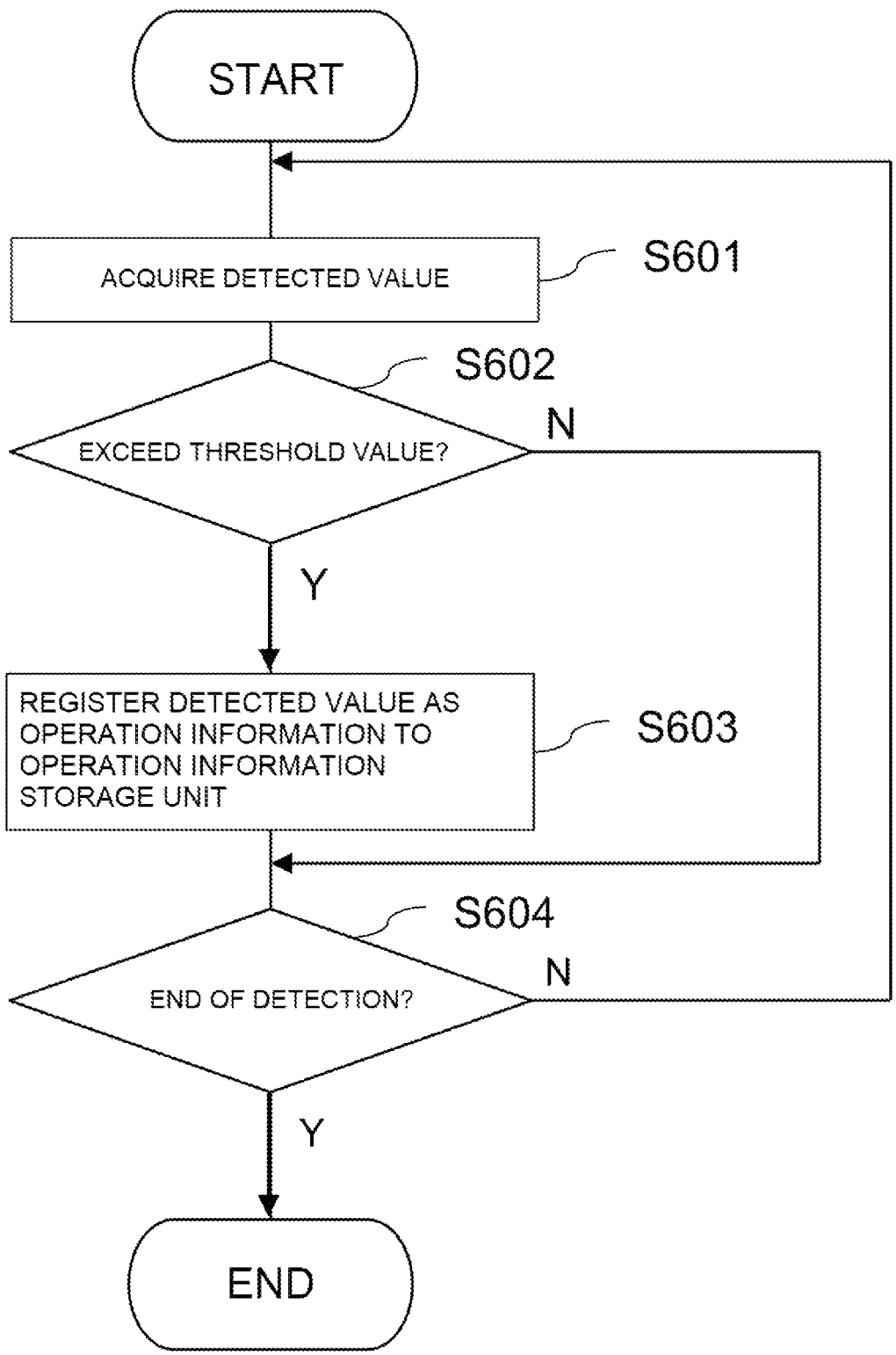
FIG. 20 is a processing flow diagram illustrating a flow of processing executed by an operation information collection system for a fluid control device according to a third embodiment of the present invention.

Subsequently, flows of processing executed by the operation information collection system for the fluid control device according to the present embodiment will be described with reference to FIG. 20.

When the detected value acquisition unit 51 acquires the detected value (S601), the determination processing unit 56 determines whether the detected value exceeds the threshold value that is set based on the predetermined determination criteria (S602). The predetermined determination criteria are information related to the detected value registered to the operation information storage unit 55 as the operation information of the fluid control device V2.

When the determination processing unit 56 determines that the detected value exceeds the threshold value that is set based on the predetermined determination criteria, the operation information registration unit 54 registers the information related to the detected value to the operation information storage unit 55 as the operation information (S603). Thereafter, the process is repeatedly executed as long as the detected value is acquired.

Although the operation information collection module 5*c* does not include the above-described specific processing unit 52, the specific processing unit 52 may be provided to specify an opening and closing timing of the fluid control device V3, and only at the opening and closing timing, a comparison determination between the detected value and the threshold value set based on the predetermined criteria may be performed.

Further, although the operation information collection module 5*c* according to the second embodiment does not include the above-described calculation processing nit 53, the calculation processing unit 53 may be provided, and when the detected value is registered to the operation information storage unit 55 as a result of the determination processing of the determination processing unit 56, the rate of change based on the detected value may be calculated and the detected value and the rate of change may be combined to register or only the rate of change may be registered to the operation information storage unit 55.

The second and third embodiments described above are configured to determine changes in the behavior tendency of fluid controllers V2 and V3 based on the detected values and their rate of change, from comparison with a predetermined threshold value, and to register the contents according to that determination in the operation information storage unit 55. As long as such determination processing and registration processing are executed, various design changes are possible.

Monitoring changes in the behavior tendency and an accuracy of the determination result by the operation information collection system according to the second embodiment and the third embodiment are possible because the fluid control devices V2 and V3 operate in a limited operating range, such as within a top dead center and a bottom dead center, differences between operations are unlikely to occur, and a reproductivity is relatively high among mechanical elements.

Further, in the second embodiment and the third embodiment, described above, it is not necessary to calculate the rate of change when the previous detected value or the rate of change is compared with the latest detected value and the rate of change, if the changes in the behavior tendency of the fluid control device V3 is determined or if it is determined that there is no change in the behavior tendency. If there is no change in the behavior tendency of the fluid control device V3, it is not necessary to register details of the detected value or the rate of change, and only a number of operations and an elapsed time need to be registered, so that the amount of data of the operation information can be reduced.

First Modified Example of Functional Configuration

Figure 21:
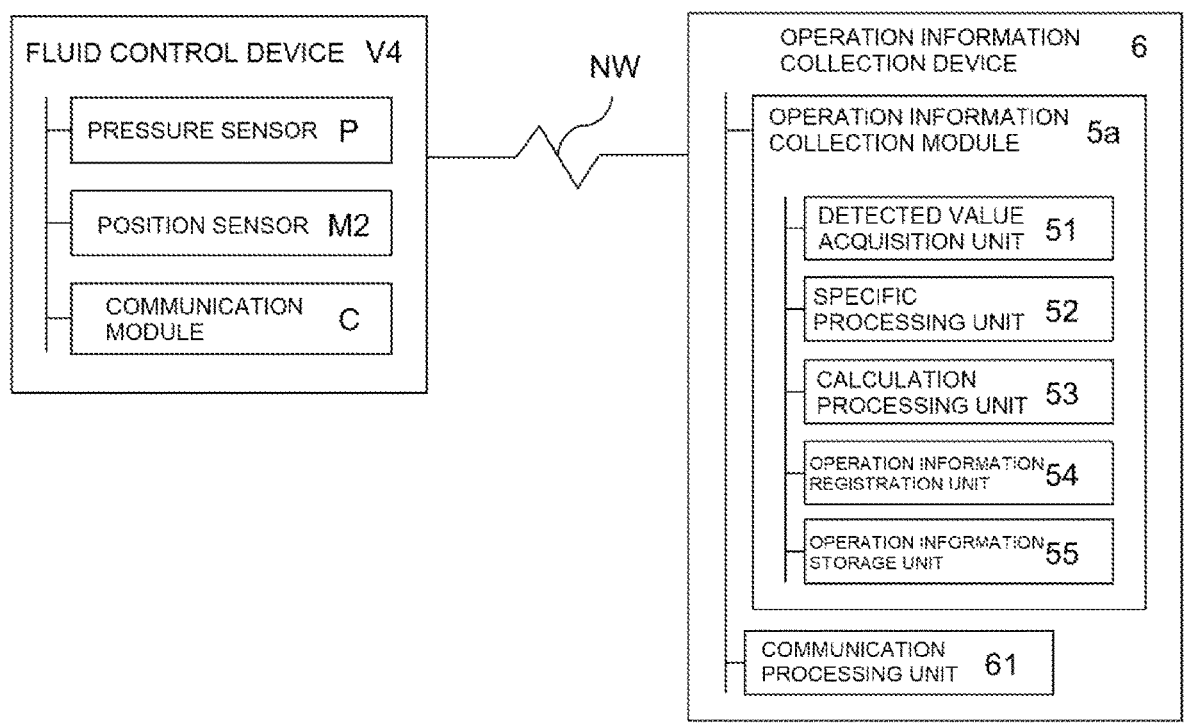
FIG. 21 is a functional block diagram illustrating another example of structures of an operation information collection system for a fluid control device according to the present invention.

FIG. 21 illustrates another functional configuration example of the operation information collection system for the fluid control device according to the present embodiment. In this example, the operation information collection system for the fluid control device according to the present embodiment is configured with a fluid control device V4 and an operation information collection device 6 which are configured to be able to communicate with each other via a predetermined network NW. The hardware configuration of the fluid control device V4 is the same as the fluid control device V, described above.

The network NW is not particularly limited as long as it is for enabling the transmission and reception of data, and it is possible to be constituted with an infrared communication, ZigBee (registered trademark), Bluetooth (registered trademark), LAN (local area network), Internet network, predetermined leased lines, communication cables, and the like, and it does not matter whether it is wired or wireless.

The fluid control device V4 according to the present example includes a communication module C for transmitting and receiving data to and from the operation information collection device 6 through the network NW.

Further, the operation information collection device 6 is realized by a so-called server computer or the like and includes the operation information collection module 5*a* mentioned above and a communication processing unit 61 for enabling data communication with the fluid control device V4 through the network NW by using hardware resources, such as a CPU (Central Processing Unit), a computer program executed by the CPU, a RAM (Random Access Memory) and a ROM (Read Only Memory) storing the computer program or the predetermined data, and an external storage device such as a hard disk drive. Not limited to this example, the operation information collection module 5a may be replaced by the operation information collection modules 5b or 5c, and this is the same for other modifications described later.

In this example, the detected value acquisition unit 51 of the operation information collection module 5a causes the communication processing unit 61 to receive the detected values by the pressure sensor P and the position sensor M2 from the fluid control device V4 and acquires the detected value.

In this system configuration example, the operation information collection device 6 acquires the information related to the detected value from the fluid control device V4 via the network NW and registers the operation information, acquired by executing the predetermined calculation processing, to the operation information storage unit 55.

Second Modified Example of Functional Configuration

Figure 22:
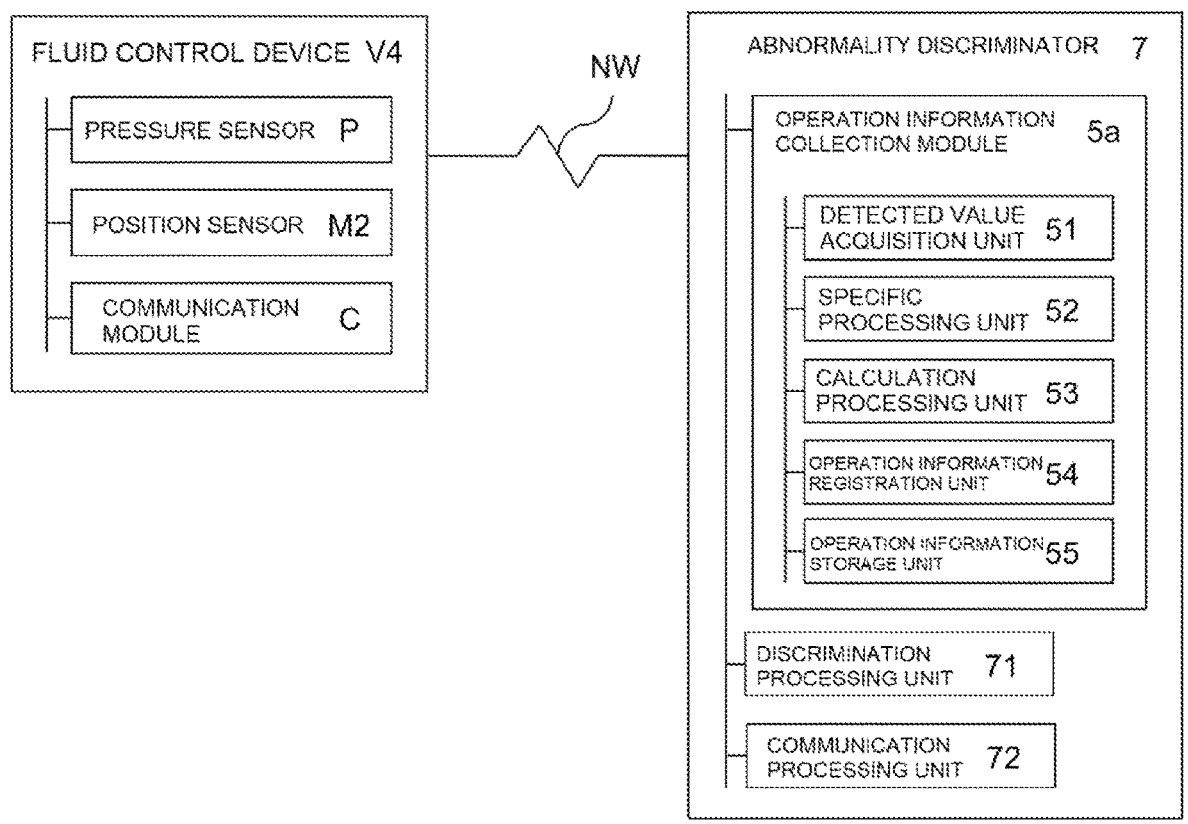
FIG. 22 is a functional block diagram illustrating another example of structures of an operation information collection system for a fluid control device according to the present invention.

FIG. 22 illustrates another functional configuration example of the operation information collection system for the fluid control device according to the present embodiment.

In this example, the operation information collection system for fluid control device according to the present embodiment includes the fluid control device V4 and an abnormality discriminator 7 including the operation information collection module 5a, which are configured to be able to communicate with each other via the predetermined network NW. The hardware configuration of the fluid control device V4 and the configuration of the network NW are as described above.

The abnormality discriminator 7 is a device to determine an abnormality of the fluid control device V4 based on the operation information of the fluid control device V4 collected by the operation information collection module 5a. This abnormality discriminator 7 is realized by a so-called server computer or the like. By using hardware resources, such as a CPU (Central Processing Unit), a computer program executed by the CPU, a RAM (Random Access Memory) and a ROM (Read Only Memory) storing the computer program or the predetermined data, and an external storage device such as a hard disk drive, the abnormality discriminator 7 incorporates the operation information collection module 5a described above and also includes a discrimination processing unit 71 for executing a processing to determine the abnormality of the fluid control device V4 and a communication processing unit 72 for executing a communication processing with the fluid control device V4 via a network NW2.

The discrimination processing unit 71 is a functional unit that executes a process of determining a presence or absence of an abnormality of the fluid control device V4 based on the operation information stored in the operation information storage unit 55.

This discrimination processing unit 71 compares a predetermined threshold value retained in a reference table and the like with a rate of change of the detected value at a predetermined time, which constitutes the operation information, to execute the process to determine the abnormality of the fluid control device V4. In other words, a limit value of the rate of change of an assumed detected value in normal use is retained as a predetermined threshold value, and when a rate of change of an actual detected value exceeds the predetermined threshold value, it can be determined that an abnormality occurs in the fluid control device V4. Most of the practical abnormalities discriminated by such discrimination processing are mainly caused by damage to the diaphragm 22, the rate of change of the detected value is out o an appropriate range as a result of fluid leaking into the closed space S2 and increased pressure in the closed space S2, or as a result of a decompression in the flow path reducing the pressure in the closed space S2.

The predetermined threshold value to be compared with the rate of change of the actual detected value may be corrected according to the accompanying information related to the operation of the fluid control device V4, such as the pressure measured by the pressure sensor P and the temperature measured by a separately provided temperature sensor. When the predetermined threshold value is corrected, the discrimination processing unit 71 compares a corrected threshold value with the rate of change of the actual detected value to execute a process to discriminate the abnormalities of the fluid control device V4.

Regardless of the example of such a functional configuration, the discrimination processing unit 71 and the operation information collection module 5a provided in the abnormality discriminator 7 may be provided in the fluid control device V4, and the fluid control device V4 itself can be configured to discriminate the abnormalities.

Figure 23:
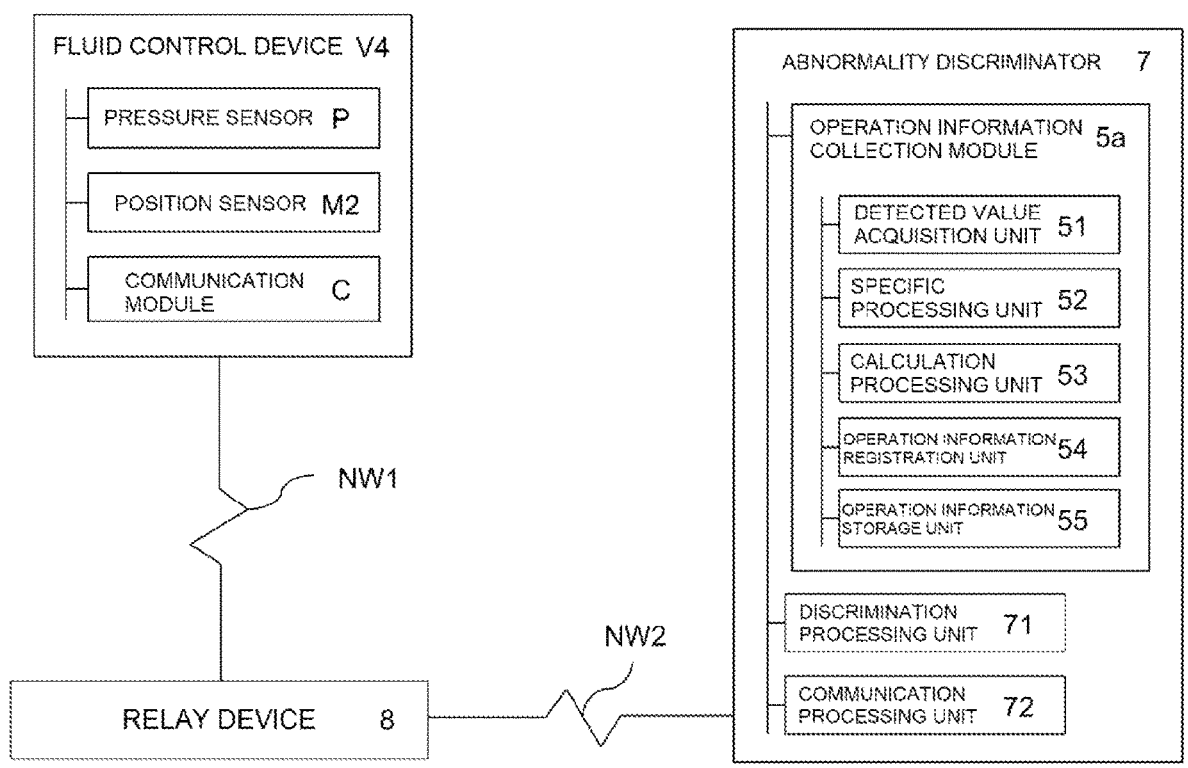
FIG. 23 is a functional block diagram illustrating another example of structures of an operation information collection system for a fluid control device according to the present invention.

In addition, as illustrated in FIG. 23, a relay device 8 may be provided between the fluid control device V4 and the abnormality discriminator 7, and the fluid control device V4 and the abnormality discriminator 7 may be configured to be able to communicate with each other via the networks NW1 and NW2.

In this example, the information related to the detected value by each sensor is provided to the abnormality discriminator 7 from the fluid control device V4 via the relay device 8.

Specifically, data transmitted by the communication module C is once transmitted to the relay device 8 via the network NW realized by wireless communication, such as Bluetooth (registered trademark), infrared communication, or ZigBee (registered trademark), and is transmitted to the abnormality discriminator 7 via the network NW1 realized by wireless or wired LAN (Local Area Network) and the like from the relay device 8.

In such an example, the communication module C can transmit information related to the detected value from each sensor at an arbitrarily set predetermined cycle, such as one hour or one day. When information is transmitted at a predetermined cycle in this way, power consumption can be reduced.

Further, when a plurality of the fluid control devices V4 are integrated to form a fluid control device, along with self-identifying information which can identify itself to the abnormality discriminator 7, the communication module C of each of the fluid control device V4 can transmit the information related to the detected value from each of the sensor at different timings for each of the fluid control device V4.

By transmitting self-identification information capable of individually identifying the fluid control devices V4 to the abnormality discriminator 7, it is possible to determine which of the plurality of the fluid control devices V4 constituting the fluid control device is acquired.

In addition, by transmitting information to the abnormality discriminator 7 at different timings for each of the fluid control devices V4, a packet collision problem can be avoided and a temporary overload of processing can be avoided compared to a case where information is transmitted all at once. Further, unlike the case where the information is transmitted all at once, it is not necessary to change a wireless channel used for data transmission for each of the fluid control devices V4, so that there is no need to prepare many channels. In particular, when the network NW is configured by Bluetooth (registered trademark), a number of simultaneous connections is limited (usually 7), so by changing a timing of the transmission, the fluid control devices V4 can be used in a number exceeding the number of simultaneous connections.

The system configuration in which the relay device 8 is interposed can also be applied to the system configured by the fluid control device V4 and the operation information collection device 6 illustrated in FIG. 21.

Third Modified Example of Functional Configuration

Figure 24:
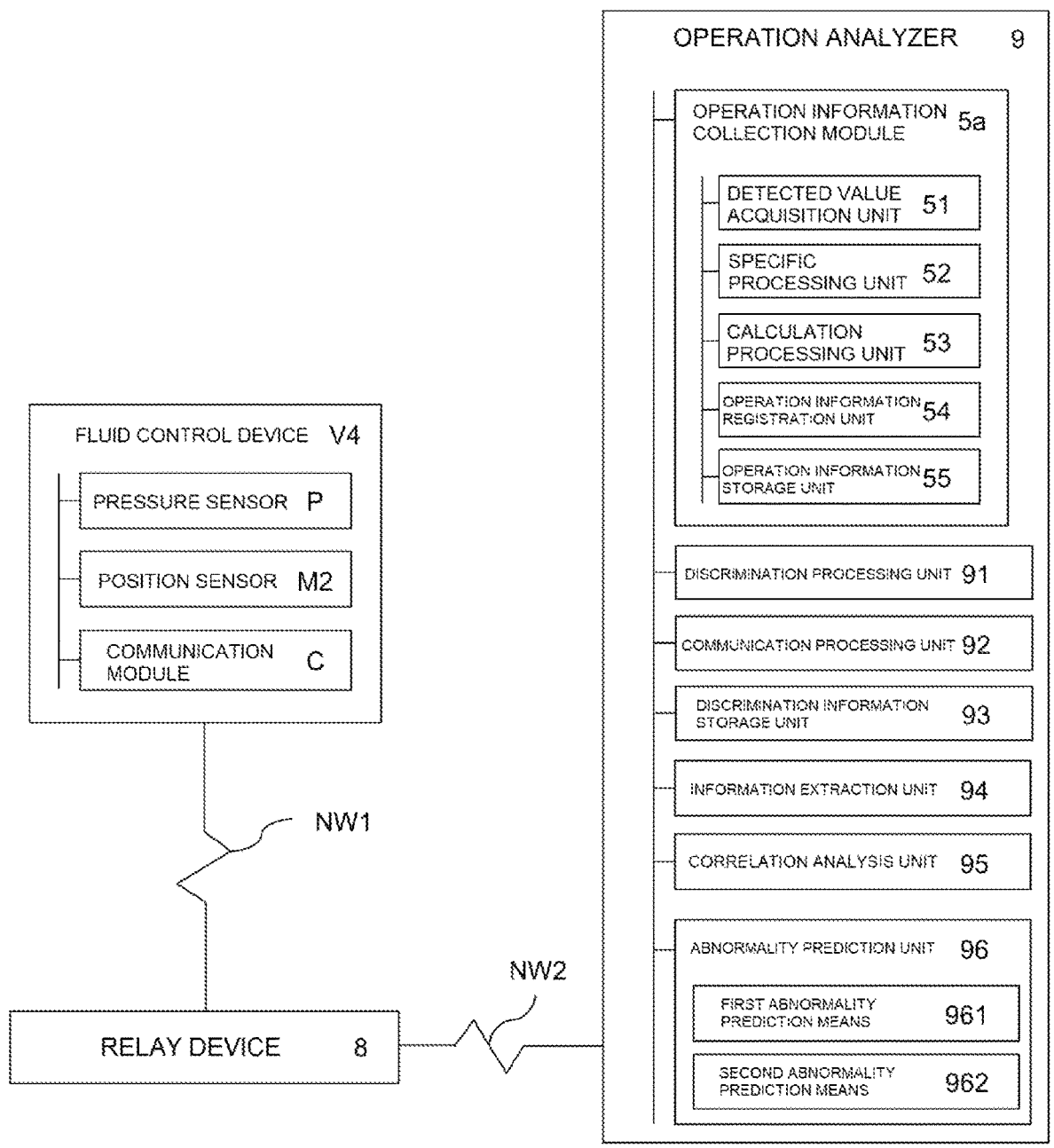
FIG. 24 is a functional block diagram illustrating another example of structures of an operation information collection system for a fluid control device according to the present invention.

FIG. 24 illustrates another functional configuration example of the operation information collection system for fluid control device according to the present embodiment.

In this example, the operation information collection system for the fluid control device according to the present embodiment includes the fluid control device V4 and an operation analyzer 9 including the operation information collection module 5a, which are configured to be able to communicate with each other via the predetermined network NW1 and NW2. The hardware configuration of the fluid control device V4 and configurations of the network NW1, NW2 and the relay device 8 are as described above.

The operation analyzer 9 is a device to execute data mining based on the information acquired from the fluid control device V4. This operation analyzer 9 is realized by a so-called server computer and the like. By using hardware resources, such as a CPU, a computer program executed by the CPU, a RAM or a ROM storing the computer program or the predetermined data, and an external storage device such as a hard disk drive, the operation analyzer 9 includes a discrimination information storage unit 93, an information extraction unit 94, a correlation analysis unit 95, and an abnormality prediction unit 96, in addition to a discrimination processing unit 91 corresponding to the discrimination processing unit 71 and a communication processing unit 92 corresponding to the communication processing unit 72.

The discrimination information storage unit 93 is a storage to store an abnormality determination result of the fluid control device V4 executed by the discrimination processing unit 91.

The information extraction unit 94 refers to the discrimination information storage unit 93 selectively extracts other operation information having a same predetermined operation information and information related to the determination result as an analysis object for each of the fluid control device V4. For example, regarding the operation information of a plurality of the fluid control devices V4, the information relating to an operation time at the same valve opening and closing number (for example: 10 million times) and the abnormality determination result at the operation time is extracted. In particular, among the operation information of the fluid control device V4, data detected from changes in the position sensor M2 and the pressure sensor P at predetermined times before and after the switching of the opening and closing state of the fluid control device V4 is extracted and used as input data. This reflects the fact that measuring changes in dynamic sensor measurements during a valve operation is effective in an abnormality anticipation, and a number of dimensions of the input data can be reduced to reduce the calculation cost of learning described later. By setting the predetermined time to be one to five times as long as the time required for opening and closing the fluid control device V4 (which is defined as a time from a start of introducing the driving pressure until the fluid control device V4 is fully opened, and the time described as the timing of the opening and closing operation in FIG. 10 and FIG. 11 corresponds to this time.), it is possible to extract data in a necessary range without waste. In addition, by transmitting the data transmitted from the fluid control device V4 within this time range in advance, the amount of data for the communication can be reduced and the power consumption of the fluid control device V4 can be reduced.

The correlation analysis unit 95 analyzes the correlation between the predetermined operation and the occurrence of an abnormality of the fluid control device V4 by comparing the information extracted by the information extraction unit 94.

In a first learning, based on a past operation information of the fluid control device V4 in which the abnormality occurred, a supervised learning is performed for classifying input data for a predetermined period before the abnormality occurred (hereinafter, referred to as a "period immediately preceding failure"), input data after the abnormality occurred, and the input data during a normal operation before the abnormality occurred. This learning is performed, for example, by Stochastic Gradient Descent method (SGD) using an error back-propagation method (or Backpropagation) for a model of a neural network.

The determination performance of the learned model differs depending on a setting of a length of the period immediately preceding failure, and a length of the predetermined period is also a hyper parameter to be adjusted in the same way as hyper parameters, such as a number of layers and a number of nodes of the neural network. An adjustment of these hyper parameters is selected by, for example, an optimization algorithm, and a value having a high determination ability can be selected. On the other hand, depending on a purpose of a valve user, clustering may be performed by preparing two or more kinds of periods as the period immediately preceding failure corresponding to a case where the value of another period immediately preceding failure is desired. In addition, different classifications may be created for each type of failure, and it is possible to anticipate which failures will occur within the predetermined period of time.

According to the analysis, for example, regarding the operation information of the plurality of the fluid control devices V4, it is possible to analyze whether a probability of occurrence of abnormality differs depending on whether it is a number of times counted in 3 months or a number of times counted in 3 years even with the same 10 million valve opening and closing based on the operation time required to open and close the valve 10 million times and the abnormality determination result in the operation time.

In a second learning, unsupervised learning using an automatic encoder is performed in order to detect a special abnormality with a small amount of data in advance. The automatic encoder inputs the input data when the valve was operating normally to the model configured by the neural network, and performs learning so that the same data is outputted. By setting a number of dimensions of hidden layers of this neural network to be smaller than a number of dimensions of the input data and the output data, it is possible to learn the automatic encoder capable of appropriately reproducing original data only for a pattern of the input data in normal operation.

The abnormality prediction unit 96 refers to the operation information and the abnormality determination results of the fluid control device V4 stored in the operation information storage unit 55 and the discrimination information storage unit 93 based on the analysis result of the correlation analysis unit 95, and predicts the abnormality of the fluid control device V4 by calculating an abnormality occurrence probability of the fluid control device V4. By using a measurement value of the current sensor data as an input to classify the learned model obtained by the first learning, a probability that the valve is in the period immediately preceding failure can be calculated (a first abnormality prediction means 961). In other words, this probability is an abnormality occurrence probability that breaks within the predetermined period.

In addition, the input data obtained from the current sensor is passed through the automatic encoder obtained by the second learning, and the output is compared to the original input, and a distance between the input and output is calculated by L2 norm or the like and compared to the predetermined threshold value (a second abnormality prediction means 962). The automatic encoder is configured to restore the original data if it is data during normal operation. However, since the original data cannot be restored during the abnormal operation and a difference between the input and output increases, the abnormality of the fluid control device V4 can be detected if the threshold value is exceeded. By using this method in combination with the supervised learning, it is possible to previously detect an abnormal state (for example, sensor failure, extreme changes in operating temperature and the like) of an obvious outlier that is not prepared as training data, and it is possible to improve the reliability of the determination of the period immediately preceding failure. In other words, it is possible to deal to some extent with the problem that the supervised learning in the first learning is not guaranteed to behave with respect to a region where there is no training data. The fluid control device V4 is often placed in a completely different operating environment due to modifications to the device on which it is mounted, and can also be used as indicator data to determine whether it should be re-learned.

If the abnormality can be expected, the information may be notified to the administrator terminal used by the administrator of the fluid control device V4, the information may be notified to the fluid control device V4, and the information may be notified to the notification means provided in the fluid control device V4.

In the above example, the operation analyzer 9 is provided with the discrimination processing unit 91, but the fluid control device V4 may be provided with the same function as the discrimination processing unit 91.

Further, in the analysis by the correlation analysis unit 95, for example, it is expected that the following analysis results can be obtained.

(1) Correlation between a number of opening and closing of the fluid control device V4 during the same period of use and abnormality occurrence For example, it is expected that the abnormality occurrence probability will differ between opening and closing valve 10 million times in 3 years and opening and closing the valve 10 million times in 3 months.

(2) Correlation between environmental temperature and abnormality occurrence

For example, it is expected that the abnormality occurrence probability will differ between use in an environment of 20° C. and use at 80° C.

(3) Correlation between thrust of the piston 43 and abnormality occurrence

For example, it is expected that the magnitude of the thrust of the piston 43 (depending on the magnitude of the driving pressure) will affect the load on the diaphragm 22.

(4) Correlation between opening and closing speed of the fluid control device V4 and abnormality occurrence For example, it is expected that the abnormality occurrence probability will differ depending on the magnitude of the average moving speed of the piston 43.

(5) Correlation between vibration and abnormality occurrence

For example, it is expected that the abnormality occurrence probability will differ depending on the magnitude of the environment (vibration).

(6) Correlation between distortion of members constituting the fluid control device V4 and abnormality occurrence For example, it is expected that the abnormality occurrence probability will differ depending on the magnitude of an internal stress of each member.

(7) Correlation between humidity and abnormality occurrence

For example, humidity and the abnormality occurrence of each member, especially O-rings O1, O21, O22 and the like, are different.

(8) Correlation between initial hardness and change in hardness and abnormality occurrence For example, it is expected that the abnormality occurrence probability will differ depending on the magnitude of the initial hardness of each member at an initial stage of use of the fluid control device V4. It is also expected that the abnormality occurrence probability will differ depending on the magnitude of hardness change rate.

Depending on the result of model learning, the measured value of each sensor may be a model including processing equivalent to extraction of predetermined frequency components, cross-correlation calculation between multiple sensor data, matching with a predetermined pattern, integration, differentiation, and the like.

In addition, if the abnormality determination result of the fluid control device V4 stored in the discrimination information storage unit 93 includes information capable of grasping which member is damaged or the like due to an abnormality (for example, damage to the diaphragm 22, damage to the O-rings O1, O21, O22, members in the actuator body 41 such as the piston 43 and the like), it is also possible to grasp which member is likely to be affected by changes in valve opening and closing speed, changes in flow rate, piston immobility and the like.

Further, the abnormality occurrence may be predicted by the data mining described above, and its predicted information and a presence or absence of an actually occurred abnormality may be further compared and analyzed to improve the accuracy of the correlation analysis.

REFERENCE SIGNS LIST

C communication module
M1 magnet
M2 position sensor
NW, NW1, NW2 network
P pressure sensor
driving pressure introduction chamber
V, V1, V2, V3, V4 fluid control device
1 valve body
11 base
12 cylindrical part 2 bonnet part
21 seat
22 diaphragm
23 diaphragm retainer
24 bonnet
25 bonnet wall
26 flexible cable
27 circuit board
28 connector
29 packing
3 cover part
31 cover
32 plate
33 plate
4 actuator part
41 actuator body
42 actuator cap
43 piston
44 spring
5a, 5b, 5c operation information collection module
51 detected value acquisition unit (detected value acquisition means)
52 specific processing unit (specific processing means)
53 calculation processing unit (calculation processing means)
54 operation information registration unit (operation information registration means)
55 operation information storage unit (operation information storage means)
56 determination processing unit (determination processing means)
6 operation information collection device
61 communication processing unit
7 abnormality discriminator
71 discrimination processing unit
72 communication processing unit
8 relay device
9 operation analyzer
91 discrimination processing unit
92 communication processing unit
93 discrimination information storage unit
94 information extraction unit
95 correlation analysis unit
96 abnormality prediction unit
961 first abnormality prediction means
962 second abnormality prediction means

The invention claimed is:

1. A system for collecting, with reduced collected data amount, operation information of a fluid control device, the system comprising:
   a detected value acquisition means acquiring detected values from the fluid control device, as acquired detected values, wherein the detected values are, for a predetermined time zone during the acquiring, detected values of a state change or a device operation that is able to detect opening and closing operations of the fluid control device;
   a calculation processing means calculating, based on two or more of the acquired detected values acquired during the predetermined time zone, a rate of change of the acquired detected values separated by a predetermined time; and
   an operation information registration means registering, to an operation information storage means, the calculated rate of change of the acquired detected values separated by the predetermined time, as a collected operation information of the fluid control device,
   wherein a data amount of the collected operation information of the fluid control device is a reduced data amount in comparison to a data amount of the acquired detected values.

2. The system according to claim 1 for collecting, with reduced collected data amount, operation information of a fluid control device, wherein
   the calculation processing means also calculates an average value of the rate of change of the acquired detected values at predetermined time intervals; and
   the operation information registration means also registers the average value of the rate of change of the acquired detected values at the predetermined time intervals to the operation information storage means as another an operation information of the fluid control device.

3. The system according to claim 1 for collecting, with reduced collected data amount, operation information of a fluid control device, wherein
   the calculation processing means also calculates a maximum value of a rate of change of the acquired detected values at predetermined time intervals; and
   the operation information registration means also registers the maximum value of the rate of change of the acquired detected values at the predetermined time intervals to the operation information storage means as another operation information of the fluid control device.

4. The system according to claim 1 for collecting, with reduced collected data amount, operation information of a fluid control device, wherein
   the detected value acquisition means acquires continuous detected values from the fluid control device, as acquired continuous detected values,
   the calculation processing means also calculates a rate of change in the continuous acquired detected values separated at a predetermined time by a predetermined threshold value of the detected value; and
   the operation information registration means also registers the rate of change in the continuous acquired detected values separated at the predetermined time by the predetermined threshold value of the detected value to the operation information storage means as another operation information of the fluid control device.

5. The system according to claim 1 for collecting, with reduced collected data amount, operation information of a fluid control device, further comprising:
   a determination processing means referring to the operation information storage means, using a rate of change of detected values registered as operation information of the fluid control device as determination criteria, and determining whether the rate of change of the acquired detected values at predetermined time intervals exceed a threshold value set based on the predetermined determination criteria;
   wherein the operation information registration means also registers the rate of change of the acquired detected values at the predetermined time intervals as an additional operation information of the fluid control device when the rate of change of the acquired detected values at the predetermined time intervals exceeds a predetermined threshold value set based on the predetermined determination criteria.

6. The system according to claim 5 for collecting, with reduced collected data amount, operation information of a fluid control device, wherein the determination processing means uses a latest operation information among operation information stored in the operation information storage means as determination criteria.

7. The system according to claim 1 for collecting, with reduced collected data amount, operation information of a fluid control device, wherein the operation information registration means registers only an operation information of the fluid control device during an opening and closing operation of the fluid control device.

8. The system according to claim 7 for collecting, with reduced collected data amount, operation information of a fluid control device, further comprising:
   a specific processing means specifying a time when an opening and closing operation of the fluid control device is executed based on the detected value,
   wherein the calculation processing means sets the time when an opening and closing operation of the fluid control device is executed as a target time for the calculating the rate of change.

9. A fluid control device internally having the system according to claim 1 for collecting, with reduced collected data amount, operation information of a fluid control device as an operation information collection module.

10. The system according to claim 1 for collecting, with reduced collected data amount, operation information of a fluid control device, wherein:
   the detected value acquisition means also stores the acquired detected values in a predetermined storage, and
   the operation information registration means, subsequent to the operation information registration means registering the collected operation information of the fluid control device as the collected operation information of the fluid control device, deletes the acquired detected values from the predetermined storage.

11. A computer-based method for collecting, with reduction of collected data amount, an operation information of a fluid control device, the method comprising processes for a computer to execute:
   a detected value acquisition process acquiring detected values from the fluid control device, as acquired detected values, wherein the detected values are, for a predetermined time zone during the acquiring, detected values of a state change or a device operation that is able to detect opening and closing operations of the fluid control device;
   a calculation process calculating, based on two or more of the acquired detected values acquired during the predetermined time zone, a rate of change of the acquired detected values separated by a predetermined time; and
   an operation information registration process registering, to an operation information storage means, the calculated rate of change of the acquired detected values separated by the predetermined time, as a collected operation information of the fluid control device,
   wherein a data amount of the collected operation information of the fluid control device is a reduced data amount in comparison to a data amount of the acquired detected values.

12. The computer-based method according to claim 11 for collecting, with reduction of collected data amount, an operation information of a fluid control device, wherein:
   the detected value acquisition process also stores the acquired detected values in a predetermined storage, and
   the operation information registration process, subsequent to the operation information registration process registering the collected operation information of the fluid control device as the collected operation information of the fluid control device, deletes the acquired detected values from the predetermined storage.

13. A non-transitory computer-readable storage medium that stores a computer executable program for causing a computer communicatively connected to a fluid control device to perform processes for collecting and reduced data amount storing an operation information of the fluid control device, the processes comprising:
   acquiring detected values from the fluid control device, as acquired detected values, wherein the detected values are, for a predetermined time zone during the acquiring, detected values of a state change or a device operation that is able to detect opening and closing operations of the fluid control device;
   calculating, based on two or more of the acquired detected values acquired during the predetermined time zone, a rate of change of the acquired detected values separated by a predetermined time; and
   registering, to an operation information storage means, the calculated rate of change of the acquired detected values separated by the predetermined time, as a collected operation information of the fluid control device,
   wherein a data amount of the collected operation information of the fluid control device is a reduced data amount in comparison to a data amount of the acquired detected values.

14. The non-transitory computer-readable storage medium according to claim 13 that stores a computer executable program for causing a computer communicatively connected to a fluid control device to perform processes for collecting and reduced data amount storing an operation information of the fluid control device, wherein the acquiring also stores the acquired detected values in a predetermined storage, and the processes further comprise
   subsequent to the registering the collected operation information of the fluid control device as the collected operation information of the fluid control device, deleting the acquired detected values from the predetermined storage.

* * * * *